US010298473B2

(12) United States Patent
Acharya et al.

(10) Patent No.: US 10,298,473 B2
(45) Date of Patent: *May 21, 2019

(54) ANONYMIZATION OF TRAFFIC PATTERNS OVER COMMUNICATION NETWORKS

(71) Applicant: International Business Machines Corporation, Armonk, NY (US)

(72) Inventors: Arup Acharya, Nanuet, NY (US); Ashish Kundu, Elmsford, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/823,827

(22) Filed: Nov. 28, 2017

(65) Prior Publication Data

US 2018/0091400 A1    Mar. 29, 2018

Related U.S. Application Data

(63) Continuation of application No. 15/484,162, filed on Apr. 11, 2017, now Pat. No. 10,057,146, which is a
(Continued)

(51) Int. Cl.
*G06F 11/00*    (2006.01)
*G06F 12/14*    (2006.01)
(Continued)

(52) U.S. Cl.
CPC ............ *H04L 43/08* (2013.01); *H04L 43/00* (2013.01); *H04L 45/70* (2013.01);
(Continued)

(58) Field of Classification Search
CPC .......... H04L 45/70; H04L 43/08; H04L 67/42
(Continued)

(56) References Cited

U.S. PATENT DOCUMENTS 4,225,919 A    9/1980    Kyu et al.
7,343,619 B2   3/2008    Ofek et al.
(Continued)

FOREIGN PATENT DOCUMENTS

JP    2013232847 A    11/2013
WO    2012145825 A1   11/2012

OTHER PUBLICATIONS

Dolev et al., "X-or Trees for Efficient Anonymous Multicast and Reception", ACM Transactions on Information and System Security, vol. 3, No. 2, May 2000, pp. 63-84.
(Continued)

*Primary Examiner* — Saleh Najjar
*Assistant Examiner* — Feliciano S Mejia
(74) *Attorney, Agent, or Firm* — L. Jeffrey Kelly; Douglas M. Crockatt

(57) ABSTRACT

A computer-implemented method of obfuscating communication traffic patterns may include detecting, at a first communications device, data communication sessions with a second communications device via the computer server using a network protocol. At the first device, a first traffic pattern is accessed based on the data communication sessions over a first predefined time period. At the first communications device, a second traffic pattern is accessed based on the data communication sessions over a second predefined time period that occurs after the first predefined time period. At the first communications device, based on a randomization process, a dummy data communication pattern is generated for transmission to the second communication devices, whereby the dummy data communication pattern is appended to the second traffic pattern for obfuscating a traffic pattern change between the first and the second traffic pattern at the computer server used to establish the communication sessions.

20 Claims, 12 Drawing Sheets

Related U.S. Application Data continuation of application No. 14/876,882, filed on Oct. 7, 2015, now Pat. No. 9,866,532, which is a continuation of application No. 14/876,858, filed on Oct. 7, 2015, now Pat. No. 9,692,731.

(51) Int. Cl.

| | | |
|---|---|---|
| *G06F 12/16* | (2006.01) | |
| *H04L 12/26* | (2006.01) | |
| *H04L 29/06* | (2006.01) | |
| *H04L 29/08* | (2006.01) | |
| *H04L 12/721* | (2013.01) | |
| *H04L 12/725* | (2013.01) | |

(52) U.S. Cl.
CPC .......... *H04L 63/0421* (2013.01); *H04L 63/10* (2013.01); *H04L 63/1408* (2013.01); *H04L 63/1475* (2013.01); *H04L 65/1006* (2013.01); *H04L 65/1069* (2013.01); *H04L 67/10* (2013.01); *H04L 67/14* (2013.01); *H04L 67/148* (2013.01); *H04L 45/306* (2013.01)

(58) Field of Classification Search
USPC .......................................................... 726/27
See application file for complete search history.

(56) References Cited

U.S. PATENT DOCUMENTS

| | | | |
|---|---|---|---|
| 7,447,909 B2 | 11/2008 | Reith | |
| 8,358,783 B2 | 1/2013 | Davis et al. | |
| 8,429,377 B2 | 4/2013 | Chen et al. | |
| 9,015,839 B2 | 4/2015 | Ibatullin et al. | |
| 9,178,634 B2 | 11/2015 | Tidwell | |
| 9,338,646 B2* | 5/2016 | Jeon | H04W 12/02 |
| 9,483,742 B1 | 11/2016 | Ahmed | |
| 9,692,731 B2 | 6/2017 | Acharya et al. | |
| 2010/0088511 A1 | 4/2010 | Tavernier et al. | |
| 2011/0238829 A1 | 9/2011 | Brunell et al. | |
| 2012/0084464 A1 | 4/2012 | Cochinwala et al. | |
| 2012/0210428 A1* | 8/2012 | Blackwell | G06F 11/3006 726/23 |
| 2012/0307725 A1 | 12/2012 | Yamada et al. | |
| 2013/0305370 A1* | 11/2013 | Denton | H04L 63/1416 726/23 |
| 2014/0250300 A1 | 9/2014 | Runkis et al. | |
| 2016/0191918 A1* | 6/2016 | Lai | H04N 19/13 375/240.02 |
| 2016/0224766 A1 | 8/2016 | Steelberg et al. | |
| 2017/0091485 A1 | 3/2017 | Yuen et al. | |
| 2017/0104675 A1 | 4/2017 | Acharya et al. | |
| 2017/0169252 A1 | 6/2017 | Ukena-Bonfig et al. | |
| 2017/0222898 A1 | 8/2017 | Acharya et al. | |

OTHER PUBLICATIONS

Dolev et al., "Anonymous Transactions in Computer Networks", ACM Transactions on Autonomous and Adaptive Systems, vol. 7, No. 2, Article 26, Publication Date: Jul. 2012, 14 pages.

IBM: List of IBM Patents or Patent Applications Treated as Related (Appendix P), Jan. 31, 2018, 2 pages.

Pending U.S. Appl. No. 15/823,325, filed Nov. 28, 2017, entitled: "Anonymization of Traffic Patterns Over Communication Networks", 54 pages.

Pending U.S. Appl. No. 15/823,813, filed Nov. 28, 2017, entitled: "Anonymization of Traffic Patterns Over Communication Networks", 54 pages.

Pending U.S. Appl. No. 15/823,803, filed Nov. 28, 2017, entitled: "Anonymization of Traffic Patterns Over Communication Networks", 53 pages.

Pending U.S. Appl. No. 15/823,799, filed Nov. 28, 2017, entitled: "Anonymization of Traffic Patterns Over Communication Networks", 54 pages.

* cited by examiner

DTO Program: Data Traffic Obfuscation Program

ANONYMIZATION OF TRAFFIC PATTERNS OVER COMMUNICATION NETWORKS

BACKGROUND

The present invention generally relates to data communication security, and more particularly, to anonymizing data communications that are associated with one or more communication networks.

With increases in communication speeds and technology, more and more information is exchanged over various communication networks. This increased information exchange has also elevated the unauthorized accessing of such information, thus raising security concerns. For example, when Entity A communicates with Entity B, the unauthorized detection of patterns in the data communications between these two entities can expose various aspects of confidential dealings.

SUMMARY

According to one embodiment, a computer-implemented method of obfuscating communication traffic patterns occurring over a communication infrastructure including a computer server is provided. The computer-implemented method includes detecting, at a first communications device, data communication sessions with a second communications device via the computer server using a network protocol. At the first communications device, a first traffic pattern is accessed based on the data communication sessions, where the first traffic pattern determines communication occurrences between the first and the second communication devices over a first predefined time period. At the first communications device, a second traffic pattern is accessed based on the data communication sessions, where the second traffic pattern determines communication occurrences between the first and the second communications devices over a second predefined time period that occurs after the first predefined time period. At the first communications device, based on a randomization process, a dummy data communication pattern is generated for transmission to the second communications device, whereby the dummy data communication pattern is appended to the second traffic pattern for obfuscating a traffic pattern change between the first and the second traffic pattern at the computer server used to establish the communication sessions.

According to another exemplary embodiment, a computer program product for obfuscating communication traffic patterns occurring over a communication infrastructure including a computer server is provided. The computer program product includes one or more non-transitory computer-readable storage devices and program instructions stored on at least one of the one or more non-transitory storage devices. The program instructions are executable by a processor, whereby the program instructions include: instructions to detect, at a first communications device, data communication sessions with a second communications device via the computer server using a network protocol; instructions to access, at the first communications device, a first traffic pattern based on the data communication sessions, where the first traffic pattern determines communication occurrences between the first and the second communications devices over a first predefined time period; instructions to access, at the first communications device, a second traffic pattern based on the data communication sessions, where the second traffic pattern determines communication occurrences between the first and the second communication devices over a second predefined time period that occurs after the first predefined time period; and instructions to generate, at the first communications device, based on a randomization process, a dummy data communication pattern for transmission to the second communications device, whereby the dummy data communication pattern is appended to the second traffic pattern for obfuscating a traffic pattern change between the first and the second traffic pattern at the computer server used to establish the communication sessions.

According to yet another exemplary embodiment, a computer system for obfuscating communication traffic patterns occurring over a communication infrastructure including a computer server is provided. The computer system includes one or more processors, one or more computer-readable memories, one or more non-transitory computer-readable storage devices, and program instructions stored on at least one of the one or more non-transitory storage devices for execution by at least one of the one or more processors via at least one of the one or more memories. The computer system is capable of performing a method that includes detecting, at a first communications device, data communication sessions with a second communications device via the computer server using a network protocol, whereby at the first communications device, a first traffic pattern is accessed based on the data communication sessions, such that the first traffic pattern determines communication occurrences between the first and the second communications devices over a first predefined time period. At the first communications device, a second traffic pattern is accessed based on the data communication sessions, where the second traffic pattern determines communication occurrences between the first and the second communication devices over a second predefined time period that occurs after the first predefined time period. At the first communications device, based on a randomization process, a dummy data communication pattern is generated for transmission to the second communications device, whereby the dummy data communication pattern is appended to the second traffic pattern for obfuscating a traffic pattern change between the first and the second traffic pattern at the computer server used to establish the communication sessions.

According to yet another exemplary embodiment, a computer system for obfuscating communication traffic patterns occurring over a communication infrastructure including a computer server is provided. The computer system includes one or more processors, one or more computer-readable memories, one or more non-transitory computer-readable storage devices, and program instructions stored on at least one of the one or more non-transitory storage devices for execution by at least one of the one or more processors via at least one of the one or more memories. The computer system is capable of performing a method that includes detecting, at a communications device, data communication sessions with the computer server using a network protocol, whereby at the communications device, a first traffic pattern is accessed based on the data communication sessions, such that the first traffic pattern determines communication occurrences between the communications device and computer server over a first predefined time period. At the communications device, a second traffic pattern is accessed based on the data communication sessions, where the second traffic pattern determines communication occurrences between the communications device and computer server over a second predefined time period that occurs after the first predefined time period. At the communications device, based on a randomization process, a dummy data communication pattern is generated for transmission to the computer server, whereby the dummy data communication pattern is appended to the second traffic pattern for obfuscating a traffic pattern change between the first and the second traffic pattern at the computer server used to establish the communication sessions.

Embodiments of the present invention further disclose a method, computer program product, and system for detecting, at a first communications device, first data communication sessions with a second communications device via a first computer server using a network protocol; accessing, at the first communications device, an information content threshold value associated with the first data communication sessions between the first and the second communications devices; accessing, at the first communications device, a traffic pattern based on the first data communication sessions, whereby the traffic pattern determines communication occurrences between the first and the second communication devices over a predefined time period; determining, at the first communications device, an information content value associated with the accessed traffic pattern; and re-routing, using the network protocol, the first data communication sessions via the first computer server to a second data communication session between the first communications device and the second communications device via a second computer server, whereby the second data communication session is established based on a detection of the information content value associated with the accessed traffic pattern exceeding the information content threshold value.

BRIEF DESCRIPTION OF THE SEVERAL VIEWS OF THE DRAWINGS

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Figure 1A:
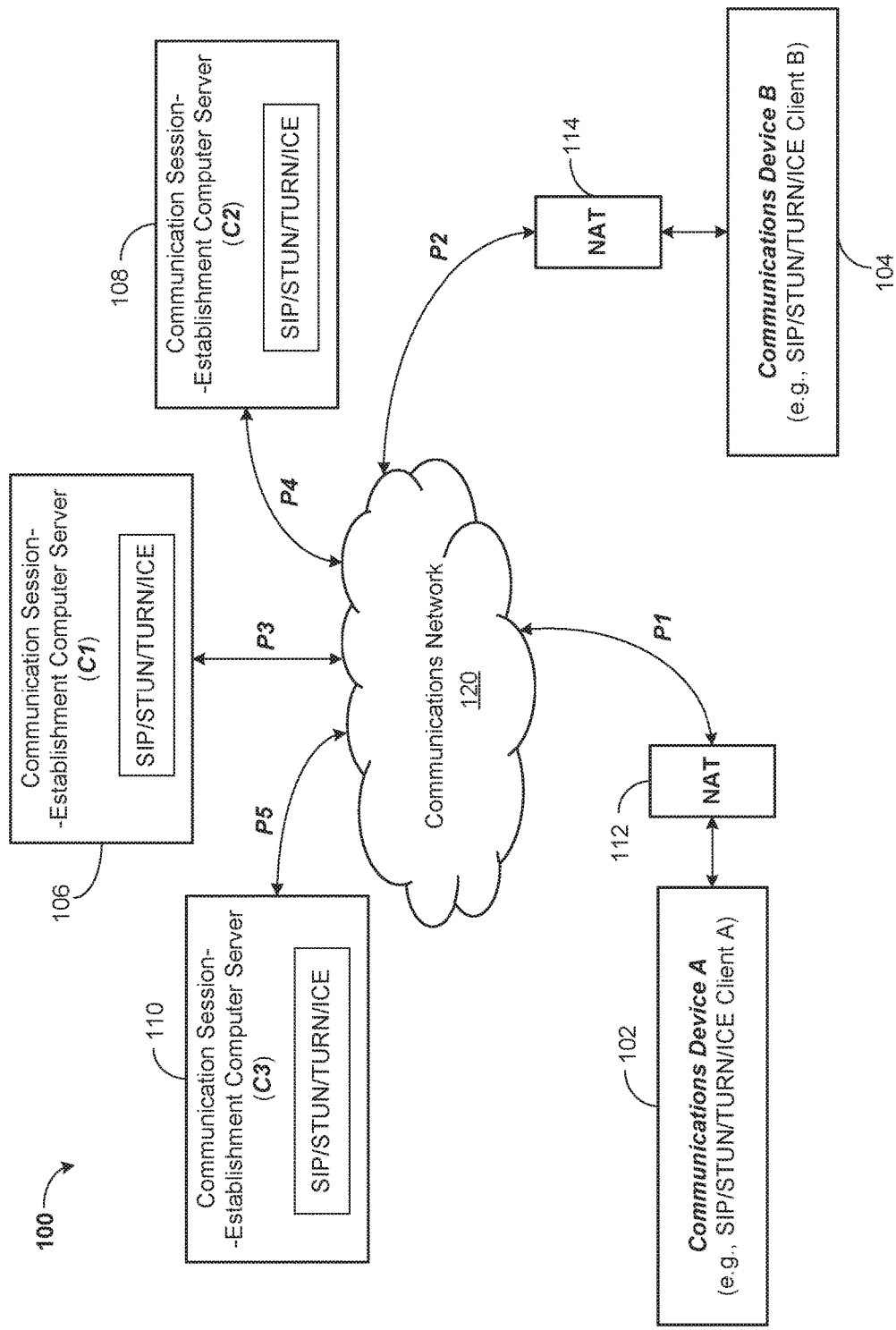
FIG. 1A shows a block diagram of an exemplary communication infrastructure, according to one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The one or more exemplary embodiments described herein are directed to, among other things, obfuscating data communication traffic patterns in such a manner as to thwart side-channel attacks. One traffic pattern may include an increase in the number of communications over a certain time period between two known entities such as competitor companies. As such, the unauthorized detection of this spike in communications could signal confidential business dealings (e.g., buyout, merger, etc.) between these rival companies. The following one or more embodiments thus anonymize these communication or traffic patterns between the entities exchanging information in a networking environment (e.g., a cloud based network architectures).

FIG. 1A shows an exemplary embodiment of a communication infrastructure 100 that may include communications device 102, communications device 104, computer server 106, computer server 108, computer server 110, network address translator (NAT) 112, network address translator (NAT) 114, and communication network 120. For illustrative brevity, infrastructure 100 depicts a few communications devices and computer servers communicating via a network. It may, however, be appreciated that communication infrastructure 100 may include a myriad of other communications devices, computer servers, and communication networks.

Communications devices 102 and 104 may include any device capable to communicating information with a third party device. For example, communications devices 102 and 104 may include smartphones, laptops, or any computational device capable of electronically communicating (e.g., voice, data, video, etc.). Servers 106-110 may be configured to provide cloud services such as software as a service (SaaS), platform as a service (PaaS), and infrastructure as a service (IaaS). The cloud services may be deployed as a private cloud infrastructure (i.e., operated for a single organization), public cloud infrastructure (i.e., services open for the public), or a hybrid cloud infrastructure being the composition of two or more public and private cloud infrastructures. The NATs 112, 114 may, among other things, map multiple private hosts to one publically exposed IP address.

In the exemplary communication infrastructure 100, the communications devices 102-104 and servers 106-110 communicate using, for example, a session initiation protocol (SIP) for signalling and controlling multimedia communication sessions (e.g., VoIP &Video conferencing). The communications devices 102-104 may additionally incorporate session traversal utilities (STUN), traversal using relays around NAT (TURN), and interactive connectivity establishment (ICE) protocols for facilitating end-point connectivity between communicating entities, particularly over the NATs 112-114 or firewalls. It may, however, be appreciated that any one or more communication standards may be utilized to facilitate data communication sessions between one or more communications devices and one or more computer servers.

In operation, for example, communications device 102 may establish a data communication session (e.g., voice, data, video, etc.) with communications device 104 via computer server 106. In the provided example, according to one implementation, computer server 106 may establish communication sessions between communications devices 102 and 104, whereby upon completion of an end-to-end connection, data is communicated between the communications devices 102, 104 over paths P1 and P2. In such an implementation, although the server computer 106 establishes the connection between the communications devices 102, 104, the communication session (e.g., VoIP session)

bypasses the server 106 and occurs between the communicating entities (i.e., communications devices 102 and 104). According to another implementation, computer server 106 may establish communication sessions between communications devices 102 and 104, whereby upon completion of an end-to-end connection, data is communicated between the communications devices 102, 104 over paths P1, P3, and P2. In such an implementation, once the server computer 106 establishes the connection between the communications device 102, 104, the communication session (e.g., VoIP session) occurs through the server 106.

In both of the above-described example implementations, computer server 106 is involved in establishing a communications session between the communicating entities (i.e., devices 102 and 104). Thus, the computer server 106 as, for example, a cloud based service, is capable of learning information about the communication sessions it manages. This learned information includes traffic information such as, but not limited to, the identification (ID) of the communicating parties (e.g., IP addresses), the start and stop times (i.e., duration) of each communication session, the frequency (i.e., how often) of the communication sessions, and the type of communication (e.g., VoIP teleconference, VoIP video teleconference, Skype® call, etc.).

An unauthorized accessing (cyberattack) of the traffic information at the computer server 106 can jeopardize the confidentiality associated with the communicating entities. For example, the unauthorized accessing of the IDs of the communicating entities (e.g., devices 102 and 104), and the time, date, and duration of the communication sessions between the identified communicating entities, may be utilized to confirm confidential business dealing between competitor companies rumored to be discussing the possibility of a merger. In particular, a spike in communications over a two month period between the identified communicating entities (e.g., devices 102 and 104) may glean access to certain confidential interactions. Alternatively, a drop in communications may be indicative of a slowdown in a deal or transaction.

Thus, the following embodiments describe improvements to network communication security by obfuscating traffic patterns between communicating entities. Indeed, network communication security concerns specifically arising in the realm of computer/communication networks are addressed. Obfuscation of data communication traffic patterns may include mitigating the determination of patterns in communication between entities. For example, increased communications over a period of time (e.g., June and July) may be obfuscated by making this traffic pattern appear as not being an irregular spike in communication.

Figure 1B:
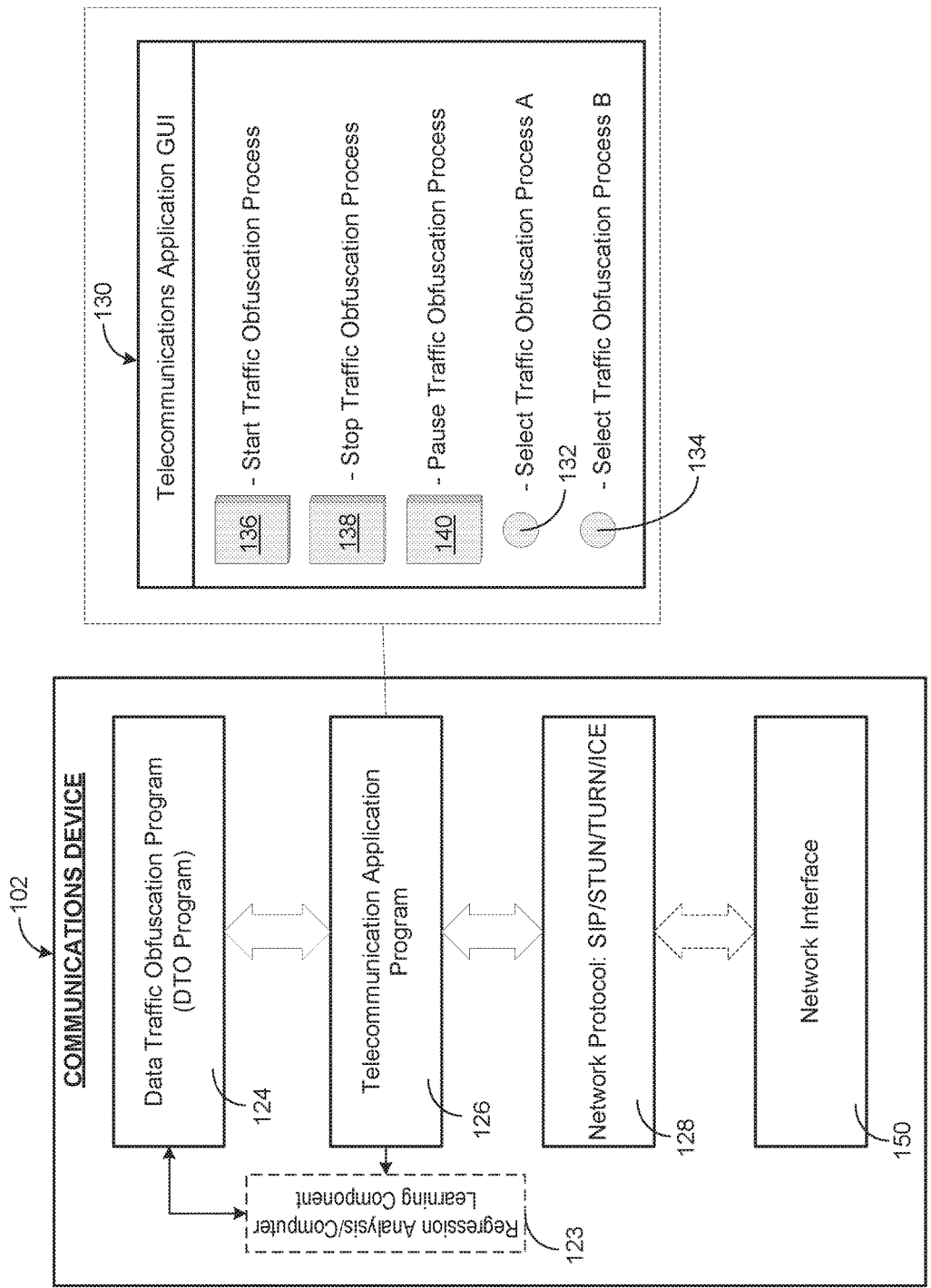
FIG. 1B shows a block diagram of an exemplary communications device, according to one embodiment.

FIG. 1B shows an exemplary embodiment of the communications device 102 utilized in the communication infrastructure 100 of FIG. 1A. As depicted, the communications device 102 may include a data traffic obfuscation program (DTO) 124, a telecommunication application program 126, requisite network protocols 128 for establishing communications over the communication network 120 (FIG. 1A), and network interface 150. The telecommunication application program 126 may provide an interface for establishing data communication sessions with another entity (e.g., FIG. 1A: communications device 104), via computer server 106 (FIG. 1B). As illustrated, the telecommunication application program 126 may include an exemplary interface screen 130 for activating, deactivating, pausing, and selecting obfuscation schemes that are carried out by the DTO program 124. Thus, the DTO program 124 obfuscates the generated traffic patterns of the telecommunication application program 126.

For example, within interface screen 130, selection buttons 132 and 134 provide a means for selecting different obfuscation methods (described in further detail in the following paragraphs). The start obfuscation button 136 initiates the selected obfuscation method while the stop obfuscation button 138 terminates the use of the DTO program 124 by the telecommunication application program 126. The pause obfuscation button 140 allows the obfuscation process to be suspended for a particular interval of time based on system performance considerations. For example, if the computational overhead associated with the obfuscation process causes the quality of service (QoS) deployed by the telecommunication application program 126 to fall below acceptable communication standards, the obfuscation process can be temporarily suspended until processing resources become available.

The telecommunication application program 126 may include any programming that is capable of providing voice communications and/or multimedia sessions over internet protocol (IP) networks such as the internet. For example, telecommunication application program 126 may include a Voice over Internet Protocol (VoIP) application program running on communications device 102. The VoIP application program may use underlying network protocols such as session initiation protocol (SIP), STUN, TURN, and ICE to provide reliable end-to-end communications between devices 102 and 104 (FIG. 1A). Other example network protocols may include Extensible Messaging and Presence Protocol (XMPP) and Skype® protocol. By interacting with the telecommunication application program 126, the DTO program 124 obfuscates traffic patterns that are generated by, for example, the VoIP (or other) telecommunication application program 126.

In alternative exemplary implementations, the DTO program 124 may be located within a network adaptor card or other network hardware 150 of the communications device 102. In such an implementation, the obfuscation process may be selected and implemented based on the IP address of the originating data, based on time of data transmission, based on the computer server used, and/or based on the network protocol employed.

Referring to FIG. 1A, the computer servers 106-110 may be cloud-based session-establishment computer servers, whereby the servers 106-110 provide the handshaking operations needed for establishing a communication session as, for example, a cloud based service. For example, any one of servers 106-110 may establish a communication session between two (or more) entities such as communications device 102 and communications device 104. Once the communication session is established, communication packets may bypass the server (e.g., server 106), while the devices 102, 104 communicate directly. Alternatively, upon establishment of the communication session, communication packets transmitted between the devices 102, 104 pass through the server (e.g., server 106).

Figure 2A:
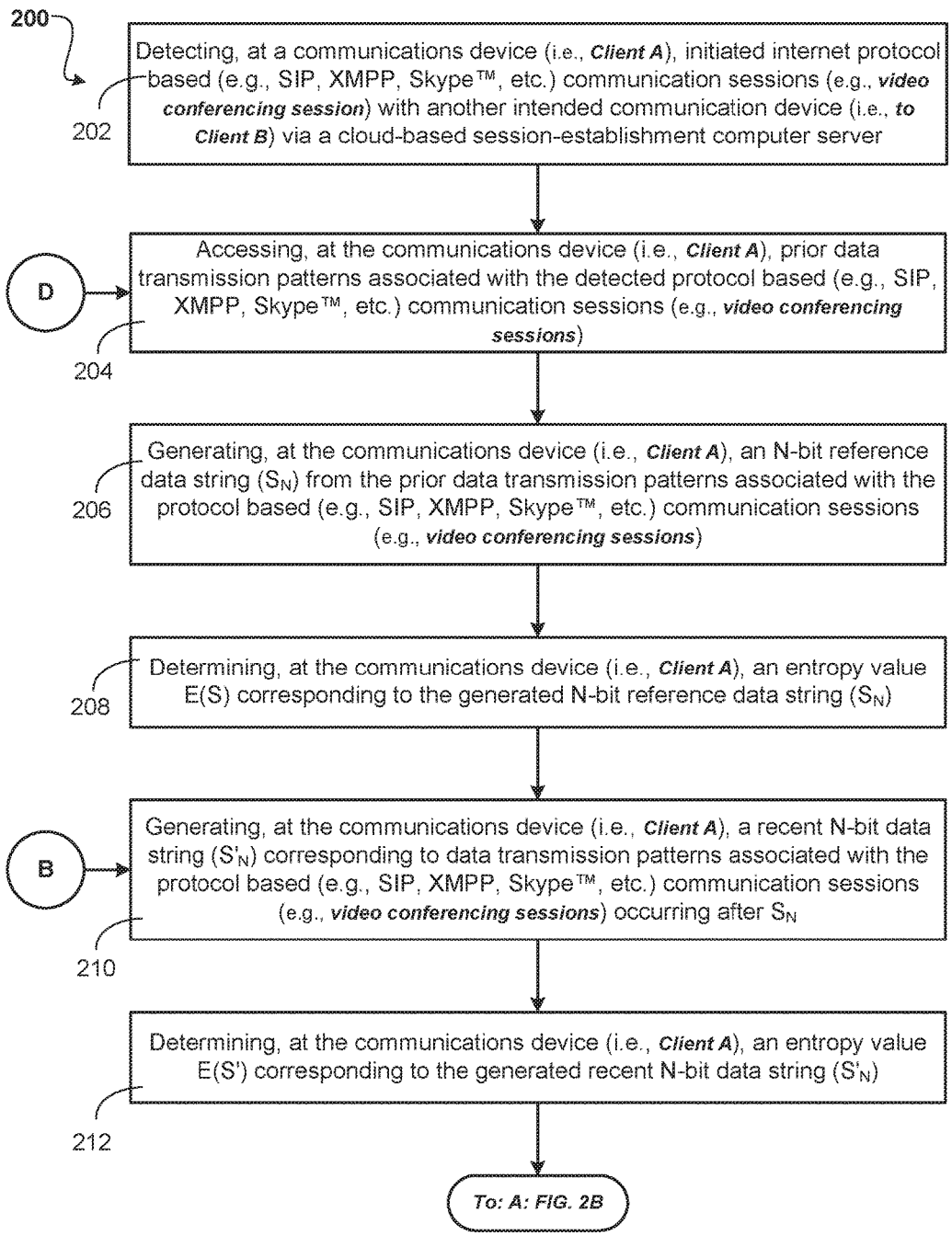
FIGS. 2A-2C show an exemplary data traffic obfuscation process, according to one embodiment.
Figure 2B:
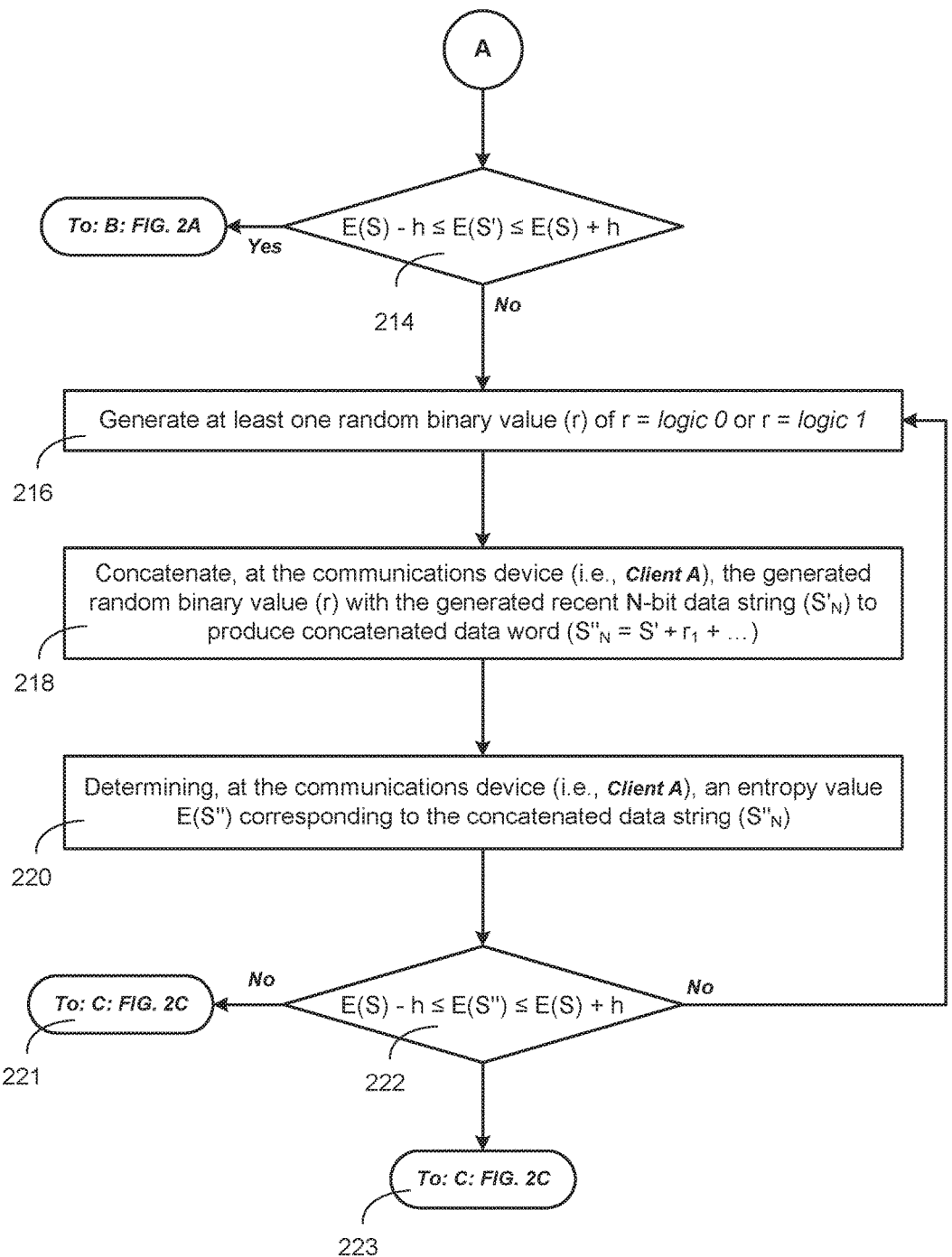
Figure 2C:
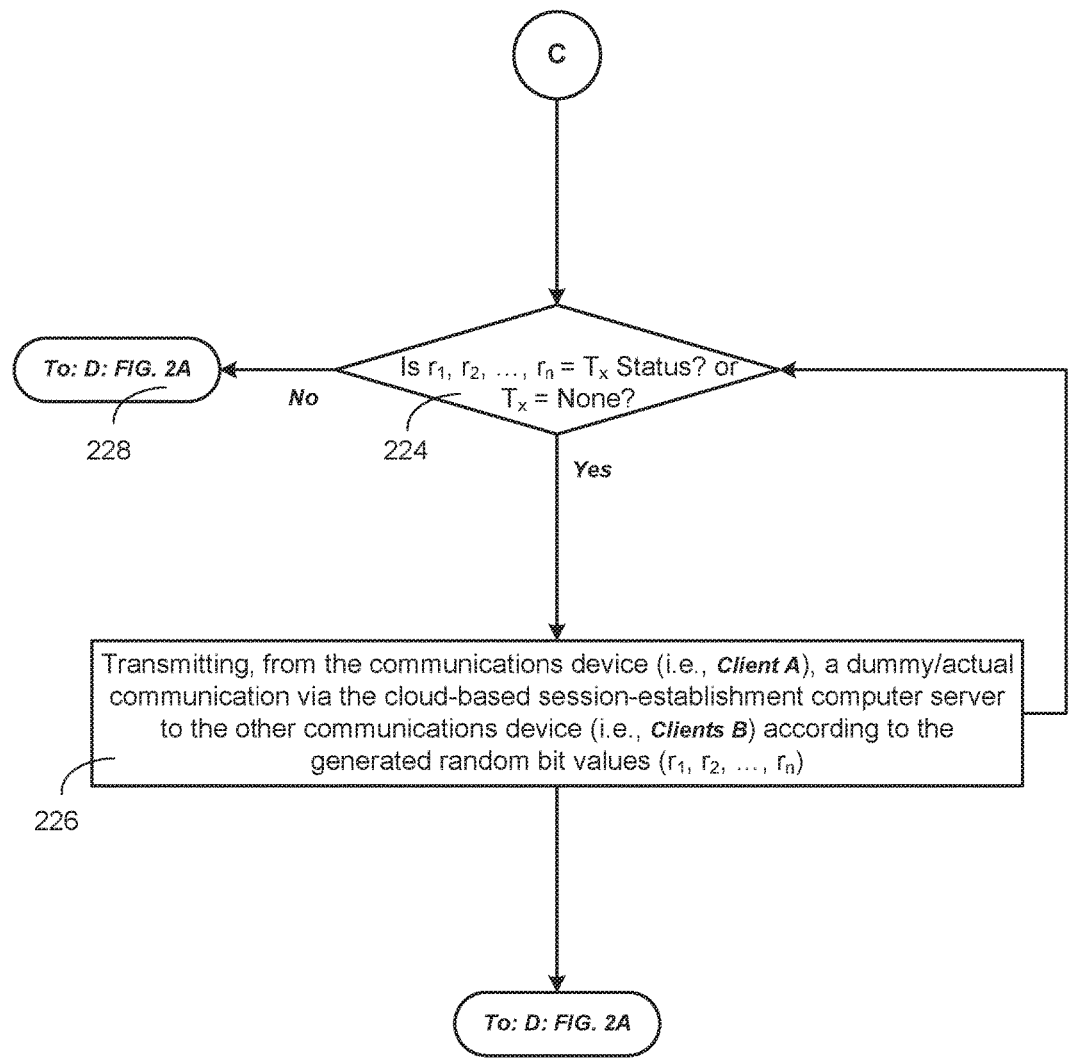

FIGS. 2A-2C show an exemplary data traffic obfuscation process 200, according to one embodiment. FIGS. 2A-2C are described with the aid of the exemplary embodiments illustrated in FIGS. 1A, 1B, 3A, and 3B. Referring to FIG. 2A, at 202, initiated network protocol based (e.g., SIP, XMPP, Skype™, etc.) communication sessions (e.g., video conferencing session) with another intended communication device via a cloud-based session-establishment computer server are detected at a communications device. For example, referring to FIG. 1A, at communications device 102 (Client A), an initiated communication session established by computer server 106 with communications device 104 (Client B) is detected. Referring now to FIG. 1B, in one exemplary implementation, the DTO program 124 associated with communications device 102 (FIG. 1A) detects communication sessions initiated by telecommunication application 126 with communications device 104 (FIG. 1A) via computer server 106 (FIG. 1A). According to an alternative exemplary implementation, the DTO program 124 associated with communications device 102 may detect communication sessions initiated with communications device 104 using a network interface 150 (e.g., network adaptor, network interface, etc.) associated with communications device 102. In such an implementation, the communication sessions can be detected by monitoring data transmissions through the network interface 150.

Referring back to FIG. 2A, at 204, a prior data transmission pattern associated with the detected protocol based (e.g., SIP, XMPP, Skype™, etc.) communication sessions (e.g., video conferencing sessions) is accessed at the communications device. For example, referring to FIG. 1A, at communications device 102 (Client A), the detected communication sessions between devices 102 (Client A) and 104 (Client B) are utilized in order to access a prior data transmission pattern that includes, for example, the time and duration of each detected communication session. The prior data transmission pattern thus provides a time sequence corresponding to communication sessions (e.g., a video conferencing session) that have occurred over a predetermined period of time. For example, the prior data transmission pattern may include the time and duration of each detected communication session between devices 102 (Client A) and 104 (Client B) over the predetermined months of January and November. Alternatively, the prior data transmission pattern may include the time and duration of each detected communication session that has occurred between devices 102 (Client A) and 104 (Client B) over the past 48 hour period. The latter example may be used in scenarios where frequent communication sessions occur over a time period. It may, however, be appreciated that communication sessions over any time period can be utilized to optimize the obfuscation of data traffic.

Referring back to FIG. 2A, at 206, an N-bit reference data string ($S_N$) from the prior data transmission pattern associated with the protocol based (e.g., SIP, XMPP, Skype™, etc.) communication sessions (e.g., video conferencing sessions) is generated at the communications device. The prior data transmission pattern corresponding to communication sessions (e.g., a video conferencing session) that have occurred over a predetermined period of time may be used to generate a data string ($S_N$), whereby for each time interval within the predetermined period of time, a detected communication session is represented by a binary '1' and an undetected communication session is represented by a binary '0'. Thus, the N-bit reference data string ($S_N$) many include a binary string, which may, for example, represent a first traffic pattern.

Figure 3A:
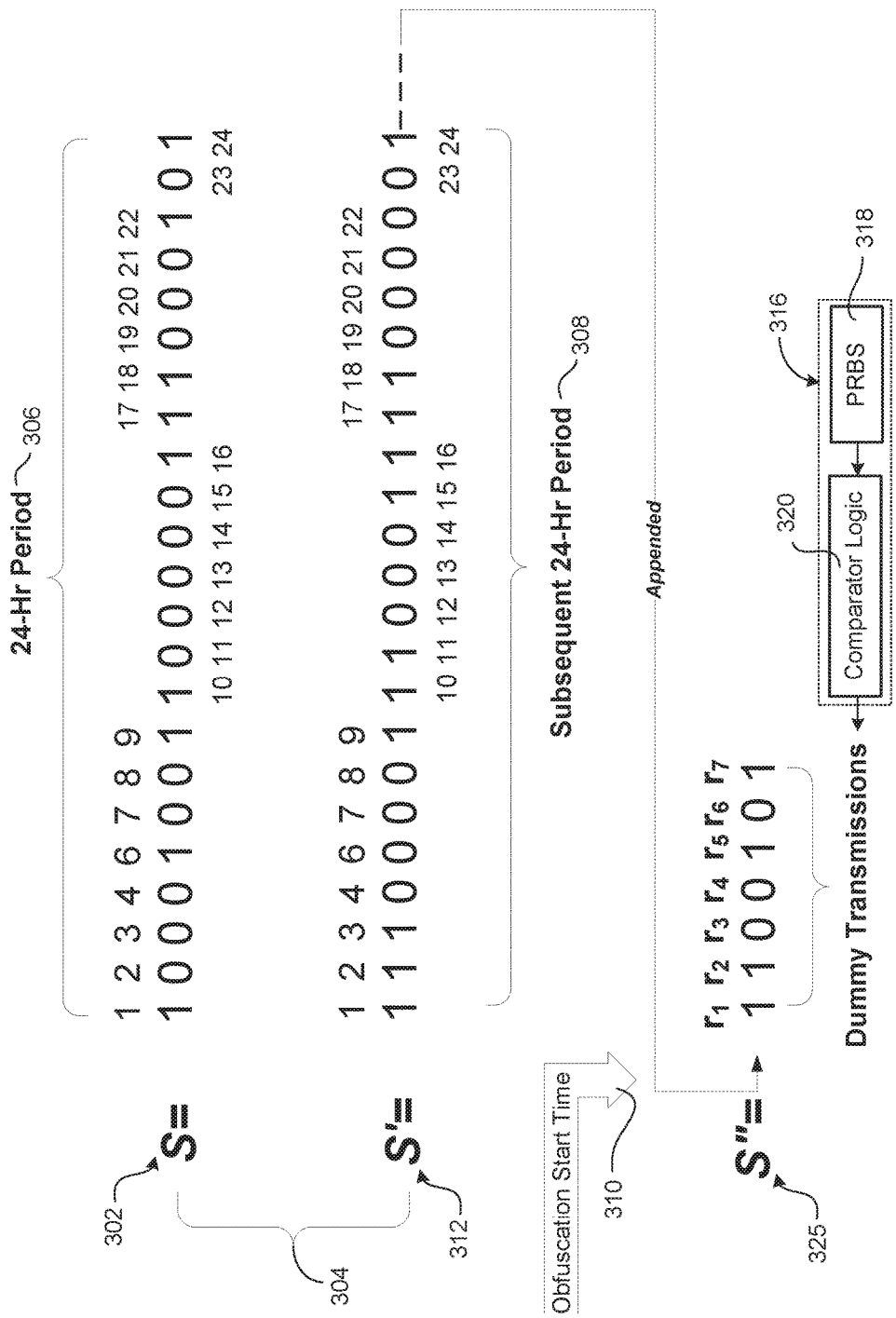
FIG. 3A shows exemplary data strings used in the exemplary data traffic obfuscation process, according to one embodiment.

Referring to FIG. 3A, an exemplary N-bit reference data string ($S_N$) 302 generated from an accessed traffic pattern 304 over a 48-hour predetermined period of time is depicted. In the illustrated example, the traffic pattern 304 indicates detected communication sessions over the past 48 hours 306, 308 prior to the initiation time of the obfuscation process 310. The exemplary N-bit reference data string ($S_N$) 302 may represent a detected traffic pattern over the first twenty four hour period 306 of the predetermined period time (i.e., 48 hours). The exemplary N-bit reference data string ($S_N$) 302 shows that within hour '1' a communication session occurred within a 10 minute interval, within hours '2-4' no communication sessions occurred, within hour '6' a communication session occurred within a 10 minute interval, within hours '7-8' no communication sessions occurred, within hour '9' a communication session occurred within a 10 minute interval, within hour '10' a communication session occurred within a 10 minute interval, within hours '11-15' no communication sessions occurred, etc.

Referring back to FIG. 2A, at 208, a numerical entropy value (e.g., 0-8) is calculated by determining the entropy value E(S) of the N-bit reference data string ($S_N$) 302 (FIG. 3A) at communications device 102 (FIG. 1A). For example, Shannon's Entropy Equation may be used to determine the entropy value. Shannon's Entropy Equation may be used to determine the information content value associated with the N-bit reference data string ($S_N$) 302, however, other methods of determining the information content value of a binary data string may also be contemplated.

Referring back to FIG. 2A, at 210, a recent N-bit data string ($S'_N$) from the prior data transmission pattern associated with the protocol based (e.g., SIP, XMPP, Skype™, etc.) communication sessions (e.g., video conferencing sessions) is generated at the communications device. The prior data transmission pattern corresponding to communication sessions (e.g., a video conferencing session) that have occurred over a predetermined period of time following the N-bit reference data string ($S_N$) may be used to generate the recent N-bit data string ($S'_N$), whereby for each time interval within the predetermined period of time, a detected communication session is represented by a binary '1' and an undetected communication session is represented by a binary '0'. Thus, the recent N-bit data string ($S'_N$) many include a binary string, which may, for example, represent a second traffic pattern. The recent data string ($S'_N$) occurs after the N-bit reference data string ($S_N$) and prior to the initiation (start) of the obfuscating process (described in the following paragraphs).

Referring to FIG. 3A, an exemplary recent N-bit data string ($S'_N$) 312 generated from the accessed traffic pattern 304 over a 48-hour predetermined period of time is depicted. In the illustrated example, the traffic pattern 304 indicates detected communication sessions over the past 48 hours 306, 308 prior to the initiation time of the obfuscation process 310. The recent data string ($S'_N$) 312 may represent a detected traffic pattern over the second twenty four hour period 308 of the predetermined period time (i.e., 48 hours). The exemplary recent data string ($S'_N$) 312 shows that within hour '1' a communication session occurred within a 10 minute interval, within hour '2' a communication session occurred within a 10 minute interval, within hour '3' a communication session occurred within a 10 minute interval, within hours '4-8' no communication sessions occurred, within hour '9' a communication session occurred within a 10 minute interval, within hour '10' a communication session occurred within a 10 minute interval, within hour '11' a communication session occurred within a 10 minute interval, within hours '12-14 no communication sessions occurred, etc. Following hour '24' of the exemplary recent data string ($S'_N$) 312, the obfuscation process may be activated, as indicated by the obfuscation start time 310. It should be appreciated that the exemplary N-bit reference data string ($S_N$) and the exemplary recent N-bit data string ($S'_N$) 312 may include different string lengths. For example, the exemplary reference data string (S) may include N-bits, while the exemplary recent data string (S') may have M-bits, whereby M>N or M<N. Further, although is some implementations the exemplary recent data string ($S'_N$) 312 temporally occurs directly after the exemplary N-bit reference data string ($S_N$), according to other implementations, one or more bits corresponding to data traffic may occur between the exemplary recent data string ($S'_N$) 312 and the exemplary N-bit reference data string ($S_N$).

Referring back to FIG. 2A, at 212, a numerical entropy value (e.g., 0-8) is calculated by determining the entropy value E'(S) of the recent data string ($S'_N$) 312 (FIG. 3A) at communications device 102 (FIG. 1A). For example, as previously described, Shannon's Entropy Equation may be used to determine the entropy value. Shannon's Entropy Equation may be used to determine the information content value associated with the recent data string ($S'_N$) 312, however, other methods of determining the information content value of a binary data string may also be contemplated.

Referring to FIG. 2B, at 214, a determination is made as to whether the calculated entropy value E'(S) of the recent N-bit data string ($S'_N$) 312 (FIG. 3A) is within a range given by E(S)+h and E(S)−h, whereby E(S) is the calculated entropy value of the N-bit reference data string ($S_N$) 302 (FIG. 3A) and 'h' is a threshold range value. If the determination establishes that the calculated entropy value E'(S) of the recent N-bit data string ($S'_N$) 312 (FIG. 3A) is within the range given by E(S)+h and E(S)−h, the process returns to 210 depicted in FIG. 2A and no obfuscation measures are taken. Processes 210 and 212 are repeated by generating a new recent data string ($S'_N$) generated by the detection of further occurrences and non-occurrences of communication sessions between the communications devices 102, 104 (FIG. 1A) as time progresses.

Alternatively, if the determination establishes that the calculated entropy value E'(S) of the recent N-bit data string ($S'_N$) 312 (FIG. 3A) is outside the range given by E(S)+h and E(S)−h, at 216, a binary value (r) having either a binary '0' value or a binary '1' is randomly generated using a randomization process. The randomly generated binary value (r) may be determined using a randomization process such as a Random Number Generator (RNG) implemented in software, hardware, or any combination thereof. The randomization process may include any method of generating one or more binary bits having values that are each randomly set (i.e., binary '1' or '0'). For example, referring to FIG. 3A, RNG 316 may include a pseudo-random binary-sequence (PRBS) generator 318 and a comparator logic block 320. At the comparator logic block 320, each generated pseudo-random binary-sequence from the PRBS generator 318 is compared to one or more binary reference sequences. If the binary value of the generated pseudo-random binary-sequence is higher than the one or more binary reference sequences, a randomly generated binary value (r) may be set to a binary '0' value. If, however, the binary value of the generated pseudo-random binary-sequence is lower than the one or more binary reference sequences, a randomly generated binary value (r) may be set to a binary '1' value.

Referring back to FIG. 2B, at 218, the randomly generated binary value (r) having either a binary '0' value or a binary '1' is concatenated (i.e., appended) with the recent N-bit data string ($S'_N$) to produce a concatenated or appended data string ($S''_N$) at the communications device 102 (FIG. 1A). For example, referring to FIG. 3A, the concatenated data string ($S''_N$) 325 (FIG. 3A) includes the recent data string ($S'_N$) 312 having one or more appended randomly generated binary values (e.g., $r_1$-$r_7$). As depicted, the first generated random binary value ($r_1$) is set to an exemplary binary '1' value. At 220, a numerical entropy value (e.g., 0-8) is calculated by determining the entropy value E"(S) of the concatenated data string ($S''_N$) 325 (FIG. 3A) at communications device 102 (FIG. 1A). For example, as previously described, Shannon's Entropy Equation may be used to determine the entropy value. Shannon's Entropy Equation may be used to determine the information content value associated with the recent data string ($S''_N$) 325, however, other methods of determining the information content value of a binary data string may also be contemplated.

At 222, a determination is made as to whether the calculated entropy value E"(S) of the concatenated data string ($S''_N$) 325 (FIG. 3A) is within a range given by E(S)+h and E(S)−h, whereby E(S) is the calculated entropy value of the N-bit reference data string ($S_N$) 302 (FIG. 3A) and 'h' is the threshold range value. If the determination establishes that the calculated entropy value E"(S) of the concatenated data string ($S''_N$) 325 (FIG. 3A) is outside the range given by E(S)+h and E(S)−h, processes 216-222 are repeated and another random binary value ($r_2$) is generated and appended to the concatenated data string ($S''_N$) 325 (FIG. 3A). For example, referring to FIG. 3A, the concatenated data string ($S''_N$) 325 now includes recent data string ($S'_N$) 312 and randomly generated binary values $r_1$ and $r_2$. As depicted, the second generated random binary value ($r_2$) is also set to an exemplary binary '1' value. If the determination at 222 continues to establishes that the calculated entropy value E"(S) of the concatenated data string (S"N) 325 (FIG. 3A) is outside the range, more random binary value (e.g., $r_1$, $r_2$, $r_3$, $r_4$, . . . , $r_7$) are generated. The concatenated one or more random binary values (e.g., $r_1$, $r_2$, $r_3$, $r_4$, . . . , $r_7$) form a dummy communication pattern that may be used to establish dummy communication sessions from communications device 102 (FIG. 1A) to communication device 104 (FIG. 1A) via computer server 106 (FIG. 1A) at time intervals (e.g., within each hourly interval) following the initiation of the obfuscation process.

As indicated at 221, in parallel with the establishing whether or not the calculated entropy value E"(S) of the concatenated data string ($S''_N$) 325 (FIG. 3A) is outside the range given by E(S)+h and E(S)−h (222), and generating the randomly generated binary values (e.g., $r_1$, $r_2$, $r_3$, $r_4$, . . . , $r_7$), the process monitors whether the communication device 102 (FIG. 1A) is going to transmit actual information to communications device 104 (FIG. 1A). Referring to FIG. 2C, at 224, it is determined whether the generated binary value (e.g., $r_1$) associated with the dummy communication pattern (e.g., $r_1$, $r_2$, $r_3$, $r_4$, . . . , $r_7$) complies (e.g., $r_1$=binary '1') with the communication device 102 (FIG. 1A) desiring to transmit actual information to communications device 104 (FIG. 1A) during the same time interval. If it is determined that the generated binary value (e.g., $r_1$) indicates the occurrence of a dummy communication session during the same time interval as communication device 102 (FIG. 1A) desiring to transmit actual information to communications device 104 (FIG. 1A), then at 226, actual data (e.g., video conference packets including multimedia data) is transmitted from communication device 102 (FIG. 1A) to communications device 104 (FIG. 1A).

If at 224 it is determined that no desired communication session (i.e., $T_x$=None) is occurring from communication device 102 (FIG. 1A) to communications device 104 (FIG. 1A), then at 226, communication device 102 (FIG. 1A) establishes a dummy communication session with communications device 104 (FIG. 1A) via server 106 (FIG. 1A) according to the generated binary values (e.g., $r_1$, $r_2$, $r_3$, $r_4$, . . . , $r_7$) representing the dummy traffic pattern. Provided $T_x$=None (224), at 226, during each corresponding time interval, communication device 102 (FIG. 1A) establishes a dummy communication session with communications device 104 (FIG. 1A) via server 106 (FIG. 1A). The dummy communication session may be an actual data communication session between the communication devices 102, 104 (FIG. 1A), whereby although an illusion of information/data exchange between the communication devices 102, 104 (FIG. 1A) is given, no information (e.g., video conference packets including multimedia data) is exchanged. For example, random or predetermined data of no informational value may be incorporated within the data packets. However, to an unauthorized entity monitoring the communications between the devices 102, 104, it will appear as a bonafide communications in which information is exchanged (e.g., audio, video, text, etc.)

Referring to FIG. 3A, for example, the dummy traffic pattern is given as $r_1$-$r_7$=1100101. Thus, during the first time interval where $r_1$=1, a dummy communication session via server 106 (FIG. 1A) is established between the communication devices 102, 104 (FIG. 1A). During the second time interval where $r_2$=1, another dummy communication session via server 106 (FIG. 1A) is established between the communication devices 102, 104 (FIG. 1A). During the third and the fourth time interval where $r_3$=$r_4$=0, no dummy communication sessions via server 106 (FIG. 1A) are established between the communication devices 102, 104 (FIG. 1A). During the fifth time interval where $r_5$=1, a dummy communication session via server 106 (FIG. 1A) is established between the communication devices 102, 104 (FIG. 1A). During the sixth time interval where $r_6$=0, no dummy communication session via server 106 (FIG. 1A) is established between the communication devices 102, 104 (FIG. 1A). Finally, during the seventh time interval where $r_7$=1, a dummy communication session via server 106 (FIG. 1A) is established between the communication devices 102, 104 (FIG. 1A).

Referring back to FIG. 2B, in the above-given example (i.e., $r_1$-$r_7$=1100101), processes 216-222 stop producing binary values after generating $r_7$=1. This occurs, when at 222, a determination is made that the calculated entropy value E"(S) of the concatenated data string (S"N) 325 (FIG. 3A: $S'_N$+$r_1$-$r_7$) is within the range given by E(S)+h and E(S)–h. As indicated at 223, under this condition the process at 224 (FIG. 2C) continues to determine whether a desired communication session (i.e., if $T_x$=None) is occurring from communication device 102 (FIG. 1A) to communications device 104 (FIG. 1A), and whether this initiated communication session complies with (i.e., is the same as) the dummy communication scheduled to be transmitted in the same time interval or slot as the initiated communication session (i.e., a non-dummy communication session).

Referring to FIG. 2C, as indicated at 228, if the initiated communication session fails to comply with (i.e., not the same as) the dummy communication scheduled to be transmitted in the same time interval as the initiated communication session (i.e., a non-dummy communication session), the process of generating dummy transmissions for obfuscating traffic patterns resets by starting the process back at 210 (FIG. 2A). For example, when $r_6$=0, no dummy communication is required. However, if at the time interval associated with $r_6$, a desired communication session occurs from communication device 102 (FIG. 1A) to communications device 104 (FIG. 1A), the process resets back to 210 (FIG. 2A).

In the above-described exemplary embodiment, the determined entropy value for E(S) may be about 1.5-2.0, and the threshold range value (h) may be about 0.2-0.3. Thus, for E(S)=1.5 and h=0.2, the range of satisfactory communications not signalling a traffic pattern change include entropy values between 1.3 (i.e., E(S)–h) and 1.7 (i.e., E(S)+h). The above-described exemplary embodiment utilizes two prior traffic patterns, a reference traffic pattern and a recent traffic pattern, to generate dummy communication sessions in order to maintain similar traffic activity between the a reference traffic pattern and a recent traffic pattern. The recent traffic pattern may include a different traffic pattern compared to the reference traffic pattern. The dummy communication sessions appended to the recent traffic pattern creates a more uniform traffic activity taken from the time the reference traffic pattern starts to the time the concatenated dummy communication sessions finish. In particular, the recent traffic pattern and the concatenated dummy communication sessions have an information content value (e.g., Entropy value) that is similar to that of the prior reference traffic pattern. Therefore, traffic activity changes associated with the recent traffic pattern are modified to be similar to that of the prior reference traffic pattern.

Figure 3B:
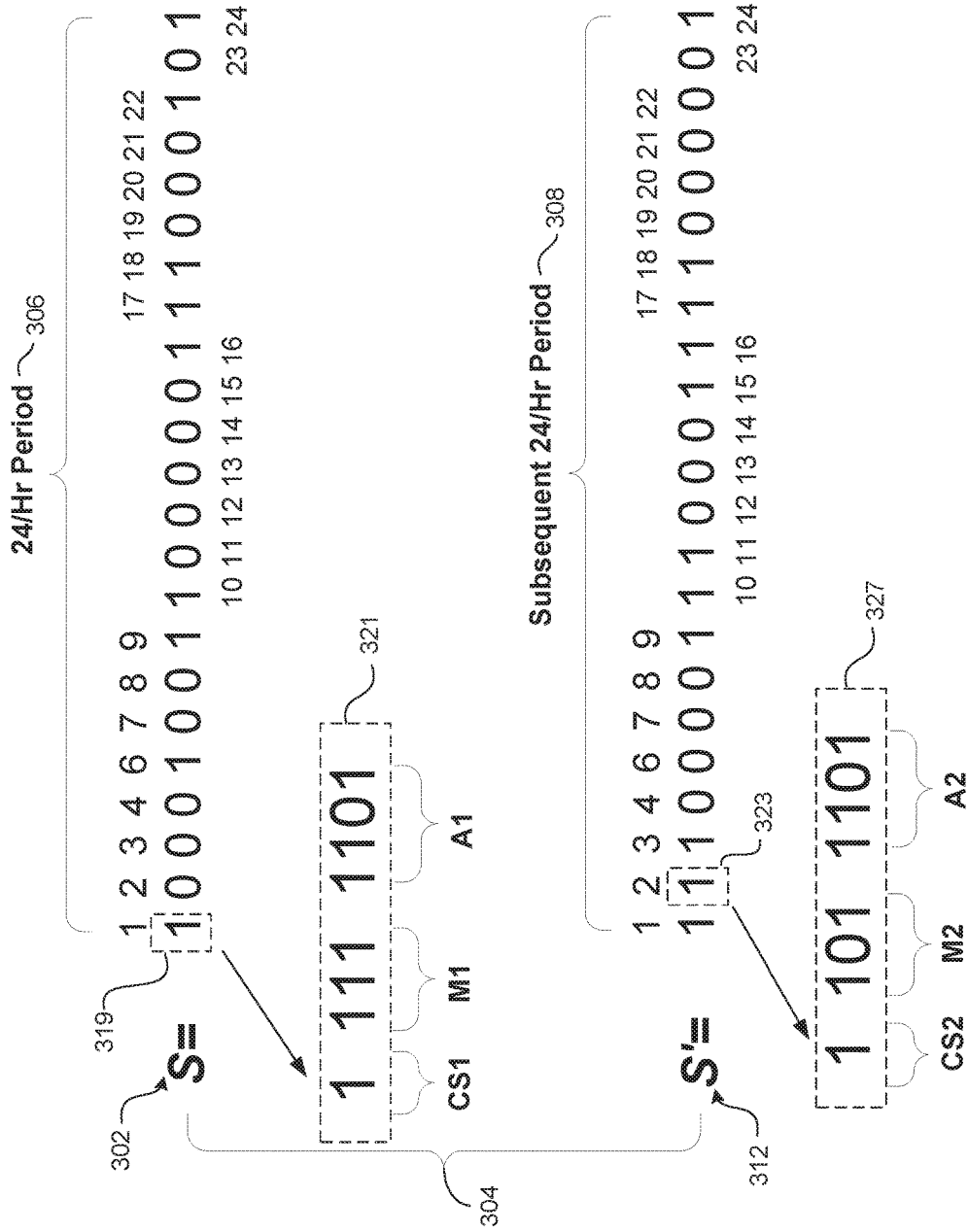
FIG. 3B shows exemplary data strings used in the exemplary data traffic obfuscation process, according to another embodiment.

Referring to FIG. 3B, an exemplary N-bit reference data string ($S_N$) 302 (identical to FIG. 3A) that is generated from an accessed traffic pattern 304 over a 48-hour predetermined period of time is depicted. As previously described, the traffic pattern 304 indicates detected communication sessions over the past 48 hours 306, 308 prior to the initiation time of the obfuscation process 310. The exemplary N-bit reference data string ($S_N$) 302 may represent a detected traffic pattern over the first twenty four hour period 306 of the predetermined period time (i.e., 48 hours). The exemplary N-bit reference data string ($S_N$) 302 shows that within hour '1' a communication session occurred within a 10 minute interval, within hours '2-4' no communication sessions occurred, within hour '6' a communication session occurred within a 10 minute interval, within hours '7-8' no communication sessions occurred, within hour '9' a communication session occurred within a 10 minute interval, within hour '10' a communication session occurred within a 10 minute interval, within hours '11-15' no communication sessions occurred, etc.

As further shown in FIG. 3B, an exemplary recent N-bit data string ($S'_N$) 312 (identical to FIG. 3A) is generated from the accessed traffic pattern 304 over a 48-hour predetermined period of time. In the illustrated example, the traffic pattern 304 indicates detected communication sessions over the past 48 hours 306, 308 prior to the initiation time of the obfuscation process 310. The exemplary recent data string ($S'_N$) 312 may represent a detected traffic pattern over the second twenty four hour period 308 of the predetermined period time (i.e., 48 hours). The exemplary recent data string ($S'_N$) 312 shows that within hour '1' a communication session occurred within a 10 minute interval, within hour '2' a communication session occurred within a 10 minute interval, within hour '3' a communication session occurred within a 10 minute interval, within hours '4-8' no communication sessions occurred, within hour '9' a communication session occurred within a 10 minute interval, within hour '10' a communication session occurred within a 10 minute interval, within hour '11' a communication session occurred within a 10 minute interval, within hours '12-14 no communication sessions occurred, etc. Following hour '24' of the exemplary recent data string ($S'_N$) 312, the obfuscation process may be activated, as indicated by the obfuscation start time 310. It should be appreciated that the exemplary N-bit reference data string ($S_N$) and the exemplary recent N-bit data string ($S'_N$) 312 may include different string lengths. For example, the exemplary reference data string (S) may include N-bits, while the exemplary recent data string (S') may have M-bits, whereby M>N or M<N.

As further illustrated in FIG. 3B, the N-bit reference data string ($S_N$) 302 may be extended, for example, to include 8-bits to represent each binary '1' bit of the traffic pattern indicating a communication session occurrence. For example, bit 319 of the N-bit reference data string ($S_N$) 302 may include byte 321, whereby the first bit, indicated as CS1, represents the occurrence of a communication session, the next three bits, indicated as M1, represents the type of media transmitted (e.g., Audio), and the final four bits, indicated by A1, corresponds to the identity of the sender. Similarly, the recent data string ($S'_N$) 312 may be extended, for example, to include 8-bits to represent each binary '1' bit of the traffic pattern indicating a communication session occurrence. For example, bit 323 of the recent data string ($S'_N$) 312 may include byte 327, whereby the first bit, indicated as CS2, represents the occurrence of a communication session, the next three bits, indicated as M2, represents the type of media transmitted (e.g., Video), and the final four bits, indicated by A2, corresponds to the identity of the sender. Using the obfuscation process of FIGS. 2A-2C, the extended data strings described above utilize the single bit (i.e., CS1 and CS2) corresponding to the occurrence of a communication session for a generating dummy communication pattern. However, when a dummy communication is transmitted, meta-information corresponding to sender identity (e.g., A1) and media information type (e.g., M1, M2) are also sent with a dummy payload.

Figure 4:
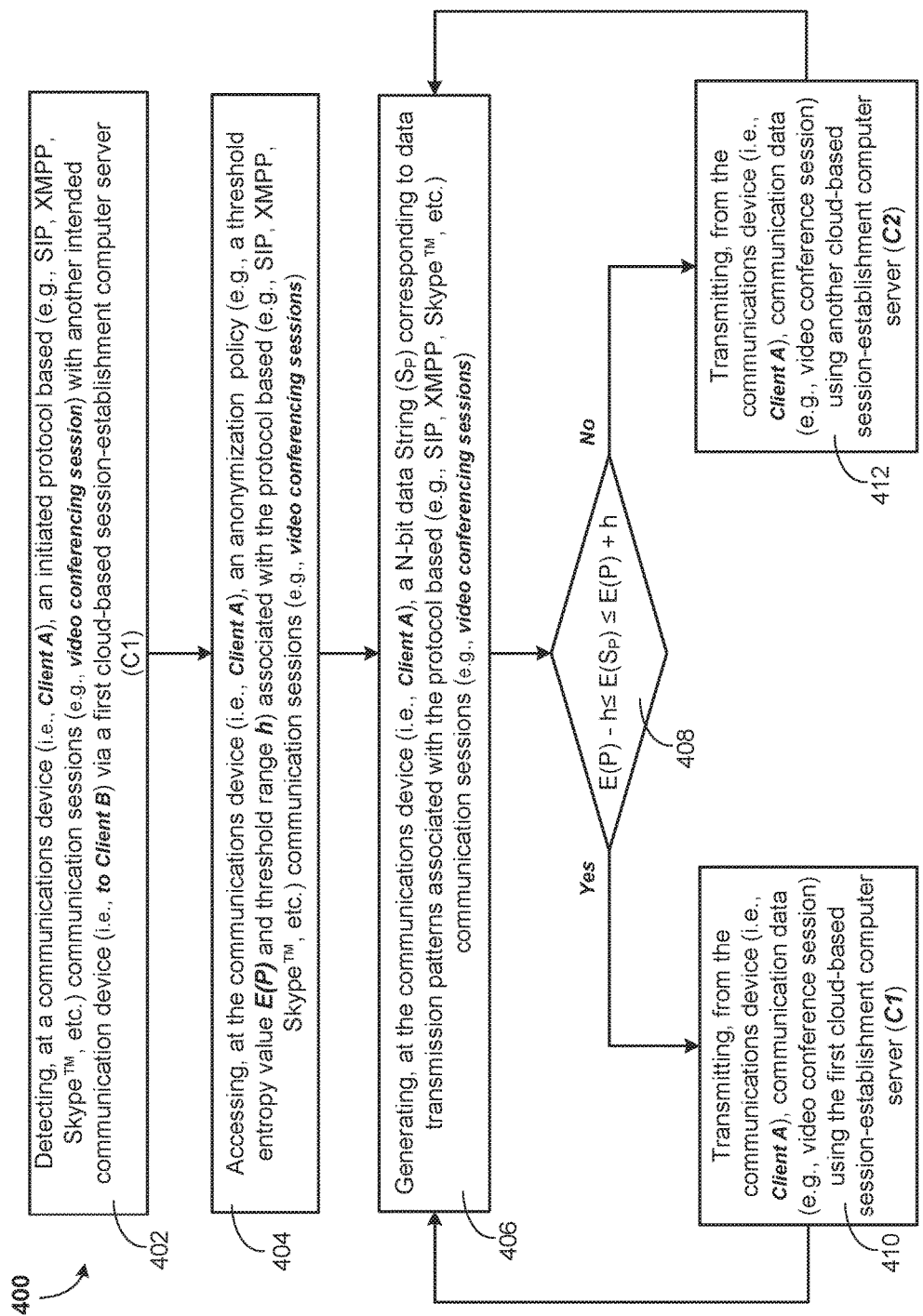
FIG. 4 show an exemplary data traffic obfuscation process, according to another embodiment.

FIG. 4 shows an exemplary data traffic obfuscation process 400, according to another embodiment. FIG. 4 is described with the aid of the exemplary embodiments illustrated in FIGS. 1A and 1B. At 402, an initiated network protocol based (e.g., SIP, XMPP, Skype™, etc.) communication sessions (e.g., video conferencing session) with another intended communication device via a first cloud-based session-establishment computer server is detected at a communications device. For example, referring to FIG. 1A, at communications device 102 (Client A), an initiated communication session established by computer server 106 (C1) with communications device 104 (Client B) is detected. Referring now to FIG. 1B, in one exemplary implementation, the DTO program 124 associated with communications device 102 detects a communication session initiated by telecommunication application 126 with communications device 104 via computer server 106. According to an alternative exemplary implementation, the DTO program 124 associated with communications device 102 may detect a communication session initiated with communications device 104 using a network interface 150 (e.g., network adaptor, network interface, etc.) associated with communications device 102. In such an implementation, the communication session can be detected by monitoring data transmissions through the network interface 150.

Referring back to FIG. 4, at 404 an anonymization policy (e.g., a threshold entropy value E(P) and threshold range h) associated with the detected protocol based (e.g., SIP, XMPP, Skype™, etc.) communication session (e.g., video conferencing sessions) between the communications device and the intended communication device is accessed. Referring to FIG. 1B, for example, the DTO program 124 associated with communications device 102 accesses an anonymization policy (e.g., a threshold entropy value E(P) and threshold range h) based on the intended communication device or devices in the detected communication session. As depicted in FIG. 1A, if the intended communication session is detected as being with communications device 104, the DTO program 124 associated with communications device 102 accesses an anonymization policy (e.g., a threshold entropy value E(P) and threshold range h) that relates to the level of obfuscation needed to mask traffic patterns between these communication devices (i.e., devices 102 and 104). For instance, for more sensitive communications (i.e., higher confidentiality), the threshold entropy value E(P) and threshold range h may be lower relative to less sensitive communications (i.e., lower confidentiality). In some implementations, different anonymization policies (e.g., a threshold entropy value E(P) and threshold range h) may be adopted based the entity that the communications device 102 is communicating with, the location of the server device establishing the communication session, the time of day the communication is established, etc.

At 406, a N-bit data String ($S_P$) corresponding to generated data transmission patterns associated with the protocol based (e.g., SIP, XMPP, Skype™, etc.) communication sessions (e.g., video conferencing sessions) is generated at the communications device (i.e., Client A). In particular, the communication sessions (e.g., video conferencing sessions) between the communications device (i.e., Client A) and another intended communications device is used to generate the N-bit data String ($S_P$). The data transmission pattern corresponding to the communication sessions (e.g., a video conferencing session) occurring over a predetermined period of time may be used to generate the data string ($S_P$), whereby for each time interval (e.g., each 1 hour interval) within the predetermined period of time (e.g., 48-hour period), a detected communication session is represented by a binary '1' and an undetected communication session is represented by a binary '0'. Thus, the N-bit data string ($S_P$) many include a binary string. For example, over a 48-hour period, the N-bit data String ($S_P$) corresponding to the generated data transmission patterns may include a 48-bit data string such as 11000 . . . 000 . . . 11. As such, for the given data string example, within hour '1' a communication session occurred within a 10 minute interval, within hour '2' a communication session occurred within a 10 minute interval, within hours '3-46' no communication sessions occurred, within hour '47' a communication session occurred within a 10 minute interval, and within hour '48' a communication session occurred within a 10 minute interval. Referring to FIG. 1B, when the start obfuscation button 136 is activated, the N-bit data String ($S_P$) corresponding to the generated data transmission patterns associated with the protocol based (e.g., SIP, XMPP, Skype™, etc.) communication sessions (e.g., video conferencing sessions) are accessed. Moreover, the traffic obfuscation process B button 134 is activated to utilize the process of FIG. 4.

At 408, once a numerical entropy value (e.g., 0-8) is calculated by determining the entropy value $E(S_P)$ of the data string ($S_P$) generated at 406, it is determined whether this entropy value $E(S_P)$ is within a range given by E(P)+h and E(P)–h, whereby E(P) is the threshold entropy value accessed from the anonymization policy and 'h' is a threshold range value also accessed from the anonymization policy. For example, as previously described, Shannon's Entropy Equation may be used to determine the entropy value. Shannon's Entropy Equation may be used to determine the information content value associated with the data string ($S_P$) generated at 406, however, other methods of determining the information content value of a binary data string may also be contemplated.

If the determination (408) establishes that the calculated entropy value $E(S_P)$ of the generated N-bit data string ($S_P$) is within the range given by E(P)+h and E(P)–h, at 410, the next communication session between the communications device and the intended communication device continues to occur via the first cloud-based session-establishment computer server (C1). However, If the determination (408) establishes that the calculated entropy value $E(S_P)$ of the generated N-bit data string ($S_P$) is outside the range given by $E(P)+h$ and $E(P)-h$, at 412, the next communication session between the communications device and the intended communication device is switched (re-routed) from the first cloud-based session-establishment computer server to occur via a second cloud-based session-establishment computer server (C2).

For example, referring to FIG. 1A, if the determination (FIG. 4: 408) establishes that the calculated entropy value $E(S_P)$ of the generated N-bit data string ($S_P$) is within the range given by $E(P)+h$ and $E(P)-h$, the next communication session between communications device 102 and intended communications device 104 continues to occur via computer server 106 along communication paths P1, P3, and P2. However, If the determination (FIG. 4: 408) establishes that the calculated entropy value $E(S_P)$ of the generated N-bit data string ($S_P$) is outside the range given by $E(P)+h$ and $E(P)-h$, the next communication session between communications device 102 and intended communications device 104 is re-routed to occur via computer server 108 along communication paths P1, P4, and P2. In an alternative implementation, if computer server 108 is not responding to the re-routing (i.e., system is down), the next communication session between communication device 102 and intended communication device 104 may be re-routed to occur via computer server 110 along communication paths P1, P5, and P2.

At 410, as communication sessions occur, the N-bit data string ($S_P$) is updated at 406. Thus, each updated N-bit data string ($S_P$) generated at 406 may then be used to determine the condition at 408. Once the communication sessions are re-routed at 412, the N-bit data string ($S_P$) is also updated at 406 and subsequently used to determine the condition at 408.

Figure 5A:
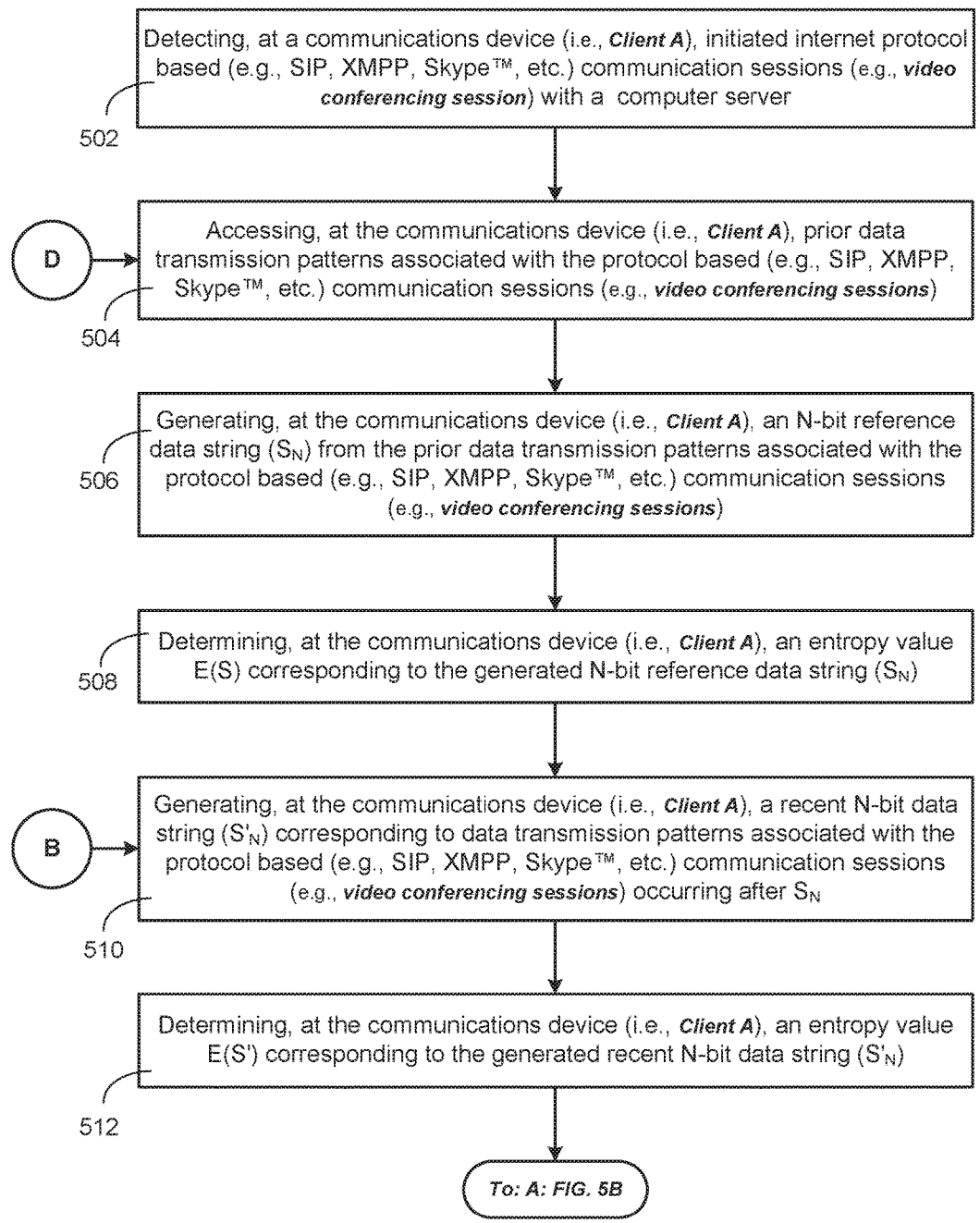
FIGS. 5A-5C show an exemplary data traffic obfuscation process, according to yet another embodiment.
Figure 5B:
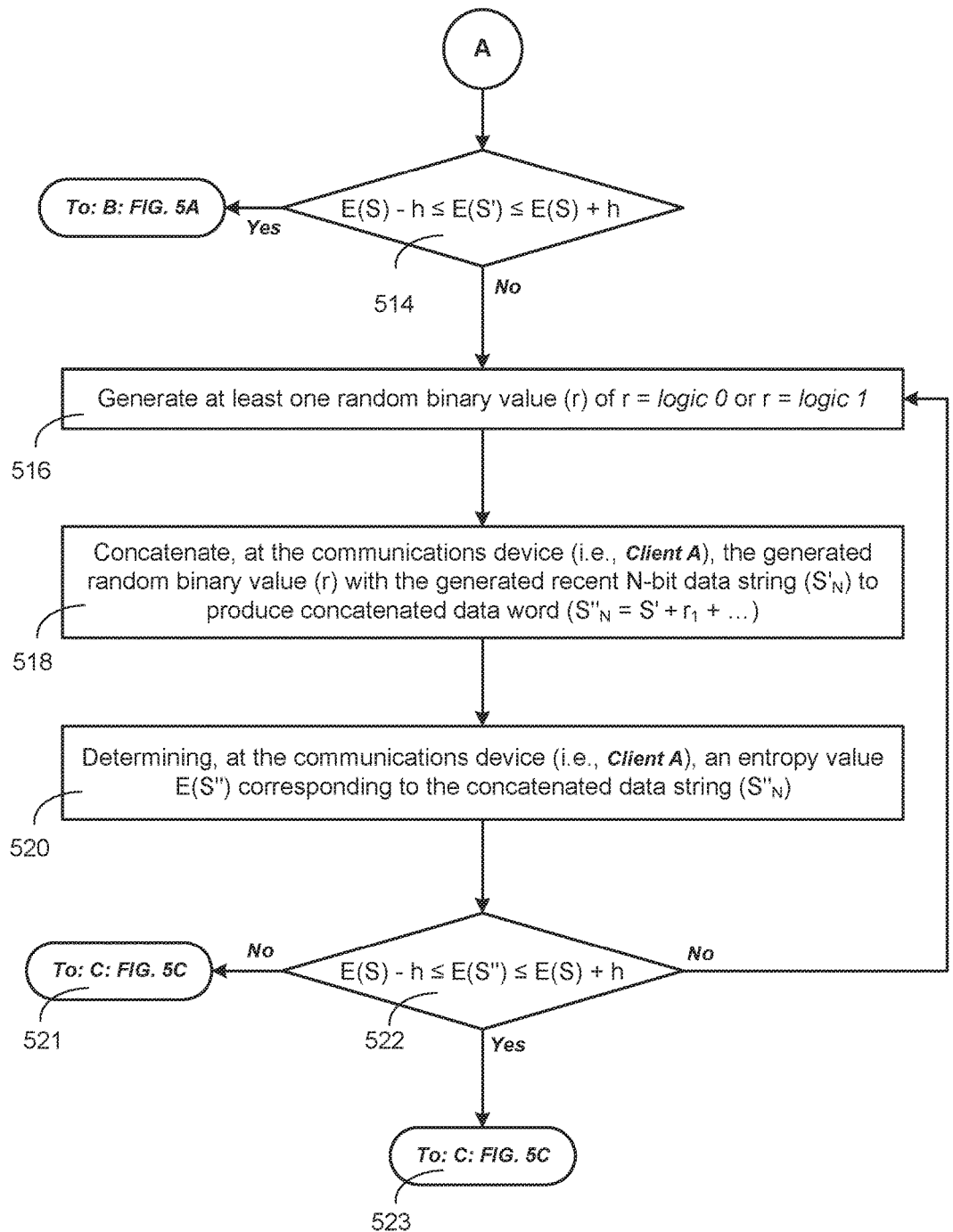
Figure 5C:
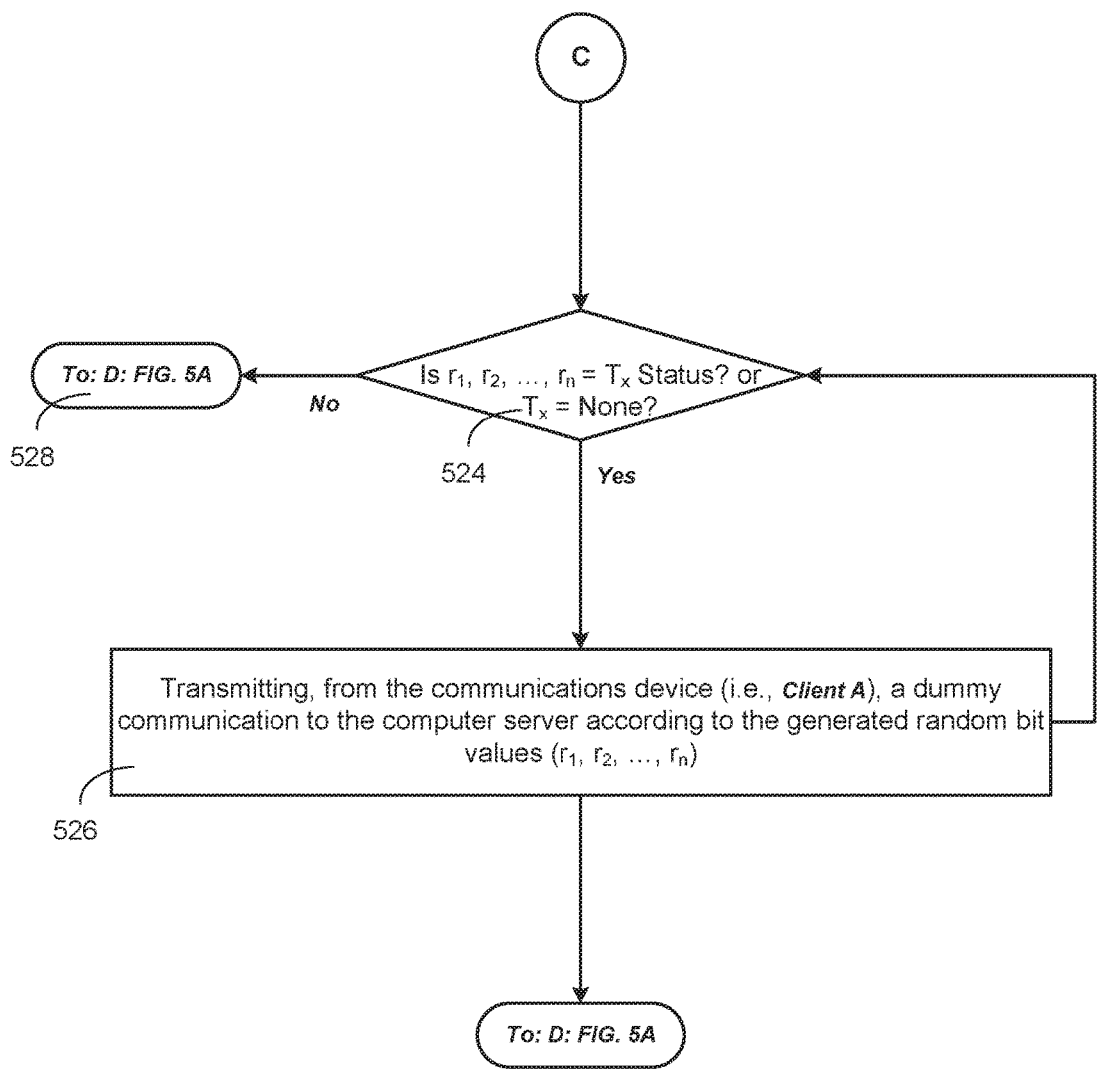

FIGS. 5A-5C show an exemplary data traffic obfuscation process, according to yet another embodiment. FIGS. 5A-5C are described with the aid of the exemplary embodiments illustrated in FIGS. 1A, 1B, 3A, and 3B. Referring to FIG. 5A, at 502, initiated network protocol based (e.g., SIP, XMPP, Skype™, etc.) communication sessions (e.g., video conferencing session) with a cloud-based session-establishment computer server are detected at a communications device. For example, referring to FIG. 1A, at communications device 102 (Client A), an initiated communication session established with computer server 106 is detected. Referring now to FIG. 1B, in one exemplary implementation, the DTO program 124 associated with communications device 102 detects communication sessions initiated by telecommunication application 126 with computer server 106. According to an alternative exemplary implementation, the DTO program 124 associated with communications device 102 may detect communication sessions initiated with computer server 106 using a network interface 150 (e.g., network adaptor, network interface, etc.) associated with communications device 102. In such an implementation, the communication sessions can be detected by monitoring data transmissions through the network interface 150.

Referring back to FIG. 5A, at 504, a prior data transmission pattern associated with the detected protocol based (e.g., SIP, XMPP, Skype™, etc.) communication sessions (e.g., video conferencing sessions) is accessed at the communications device. For example, referring to FIG. 1A, at communications device 102 (Client A), the detected communication sessions between devices 102 (Client A) and computer server 106 are utilized in order to access a prior data transmission pattern that includes, for example, the time and duration of each detected communication session. The prior data transmission pattern thus provides a time sequence corresponding to communication sessions (e.g., a video conferencing session) that have occurred over a predetermined period of time. For example, the prior data transmission pattern may include the time and duration of each detected communication session between devices 102 (Client A) and computer server 106 over the predetermined months of January and November. Alternatively, the prior data transmission pattern may include the time and duration of each detected communication session that has occurred between device 102 (Client A) and server 106 over the past 48 hour period. The latter example may be used in scenarios where frequent communication sessions occur over a time period. It may, however, be appreciated that communication sessions over any time period can be utilized to optimize the obfuscation of data traffic.

Referring back to FIG. 2A, at 506, an N-bit reference data string ($S_N$) from the prior data transmission pattern associated with the protocol based (e.g., SIP, XMPP, Skype™, etc.) communication sessions (e.g., video conferencing sessions) is generating at the communications device. The prior data transmission pattern corresponding to communication sessions (e.g., a video conferencing session) that have occurred over a predetermined period of time may be used to generate a data string ($S_N$), whereby for each time interval within the predetermined period of time, a detected communication session is represented by a binary '1' and an undetected communication session is represented by a binary '0'. Thus, the N-bit reference data string ($S_N$) many include a binary string, which may, for example, represent a first traffic pattern.

As previously described, FIG. 3A depicts an exemplary N-bit reference data string ($S_N$) 302 generated from an accessed traffic pattern 304 over a 48-hour predetermined period of time. In the illustrated example, the traffic pattern 304 indicates detected communication sessions over the past 48 hours 306, 308 prior to the initiation time of the obfuscation process 310. The exemplary N-bit reference data string ($S_N$) 302 may represent a detected traffic pattern (i.e., a first traffic pattern) over the first twenty four hour period 306 of the predetermined period time (i.e., 48 hours). The exemplary N-bit reference data string ($S_N$) 302 shows that within hour '1' a communication session occurred within a 10 minute interval, within hours '2-4' no communication sessions occurred, within hour '6' a communication session occurred within a 10 minute interval, within hours '7-8' no communication sessions occurred, within hour '9' a communication session occurred within a 10 minute interval, within hour '10' a communication session occurred within a 10 minute interval, within hours '11-15' no communication sessions occurred, etc.

Referring back to FIG. 5A, at 508, a numerical entropy value (e.g., 0-8) is calculated by determining the entropy value E(S) of the N-bit reference data string ($S_N$) 302 (FIG. 3A) at communications device 102 (FIG. 1A). For example, Shannon's Entropy Equation may be used to determine the entropy value. Shannon's Entropy Equation may be used to determine the information content value associated with the N-bit reference data string ($S_N$) 302, however, other methods of determining the information content value of a binary data string may also be contemplated.

Referring back to FIG. 5A, at 510, a recent N-bit data string ($S'_N$) from the prior data transmission pattern associated with the protocol based (e.g., SIP, XMPP, Skype™, etc.) communication sessions (e.g., video conferencing sessions) is generating at the communications device. The prior data transmission pattern corresponding to communication sessions (e.g., a video conferencing session) that have occurred over a predetermined period of time following the N-bit reference data string ($S_N$) may be used to generate the recent N-bit data string ($S'_N$), whereby for each time interval within the predetermined period of time, a detected communication session is represented by a binary '1' and an undetected communication session is represented by a binary '0'. Thus, the recent N-bit data string ($S'_N$) many include a binary string, which may, for example, represent a second traffic pattern. The recent data string ($S'_N$) occurs after the N-bit reference data string ($S_N$) and prior to the initiation (start) of the obfuscating process (described in the following paragraphs).

As previously described, FIG. 3A depicts an exemplary recent N-bit data string ($S'_N$) 312 generated from the accessed traffic pattern 304 over a 48-hour predetermined period of time. In the illustrated example, the traffic pattern 304 indicates detected communication sessions over the past 48 hours 306, 308 prior to the initiation time of the obfuscation process 310. The recent data string ($S'_N$) 312 may represent a detected traffic pattern (i.e., a second traffic pattern) over the second twenty four hour period 308 of the predetermined period time (i.e., 48 hours). The exemplary recent data string ($S'_N$) 312 shows that within hour '1' a communication session occurred within a 10 minute interval, within hour '2' a communication session occurred within a 10 minute interval, within hour '3' a communication session occurred within a 10 minute interval, within hours '4-8' no communication sessions occurred, within hour '9' a communication session occurred within a 10 minute interval, within hour '10' a communication session occurred within a 10 minute interval, within hour '11' a communication session occurred within a 10 minute interval, within hours '12-14' no communication sessions occurred, etc. Following hour '24' of the exemplary recent data string ($S'_N$) 312, the obfuscation process may be activated, as indicated by the obfuscation start time 310. It should be appreciated that the exemplary N-bit reference data string ($S_N$) and the exemplary recent N-bit data string ($S'_N$) 312 may include different string lengths. For example, the exemplary reference data string (S) may include N-bits, while the exemplary recent data string (S') may have M-bits, whereby M>N or M<N.

Referring back to FIG. 5A, at 512, a numerical entropy value (e.g., 0-8) is calculated by determining the entropy value E'(S) of the recent data string ($S'_N$) 312 (FIG. 3A) at communications device 102 (FIG. 1A). For example, as previously described, Shannon's Entropy Equation may be used to determine the entropy value. Shannon's Entropy Equation may be used to determine the information content value associated with the recent data string ($S'_N$) 312, however, other methods of determining the information content value of a binary data string may also be contemplated.

Referring to FIG. 5B, at 514, a determination is made as to whether the calculated entropy value E'(S) of the recent N-bit data string ($S'_N$) 312 (FIG. 3A) is within a range given by E(S)+h and E(S)−h, whereby E(S) is the calculated entropy value of the N-bit reference data string ($S_N$) 302 (FIG. 3A) and 'h' is a threshold range value. If the determination establishes that the calculated entropy value E'(S) of the recent N-bit data string ($S'_N$) 312 (FIG. 3A) is within the range given by E(S)+h and E(S)−h, the process returns to 510 depicted in FIG. 2A and no obfuscation measures are taken. Processes 210 and 212 are repeated by generating a new recent data string ($S'_N$) generated by the detection of further occurrences and non-occurrences of communication sessions between communications device 102 and computer server 106 (FIG. 1A) as time progresses.

Alternatively, if the determination establishes that the calculated entropy value E'(S) of the recent N-bit data string ($S'_N$) 312 (FIG. 3A) is outside the range given by E(S)+h and E(S)−h, at 516, a binary value (r) having either a binary '0' value or a binary '1' is randomly generated using a randomization process. The randomly generated binary value (r) may be determined using a randomization process such as a Random Number Generator (RNG) implemented in software, hardware, or any combination thereof. The randomization process may include any method of generating one or more binary bits having values that are each randomly set (i.e., binary '1' or '0'). For example, referring to FIG. 3A, RNG 316 may include a pseudo-random binary-sequence (PRBS) generator 318 and a comparator logic block 320. At the comparator logic block 320, each generated pseudo-random binary-sequence from the PRBS generator 318 is compared to one or more binary reference sequences. If the binary value of the generated pseudo-random binary-sequence is higher than the one or more binary reference sequences, a randomly generated binary value (r) may be set to a binary '0' value. If, however, the binary value of the generated pseudo-random binary-sequence is lower than the one or more binary reference sequences, a randomly generated binary value (r) may be set to a binary '1' value.

Referring back to FIG. 5B, at 518, the randomly generated binary value (r) having either a binary '0' value or a binary '1' is concatenated with the recent N-bit data string ($S'_N$) to produce a concatenated data string ($S''_N$) at the communications device 102 (FIG. 1A). For example, referring to FIG. 3A, the concatenated data string ($S''_N$) 325 (FIG. 3A) includes the recent data string ($S'_N$) 312 having one or more appended randomly generated binary values (e.g., $r_1$-$r_7$). As depicted, the first generated random binary value ($r_1$) is set to an exemplary binary '1' value. At 520, a numerical entropy value (e.g., 0-8) is calculated by determining the entropy value E"(S) of the concatenated data string ($S''_N$) 325 at communications device 102. For example, as previously described, Shannon's Entropy Equation may be used to determine the entropy value. Shannon's Entropy Equation may be used to determine the information content value associated with the recent data string ($S''_N$) 325, however, other methods of determining the information content value of a binary data string may also be contemplated.

At 522, a determination is made as to whether the calculated entropy value E"(S) of the concatenated data string ($S''_N$) 325 (FIG. 3A) is within a range given by E(S)+h and E(S)−h, whereby E(S) is the calculated entropy value of the N-bit reference data string ($S_N$) 302 (FIG. 3A) and 'h' is the threshold range value. If the determination establishes that the calculated entropy value E"(S) of the concatenated data string ($S''_N$) 325 is outside the range given by E(S)+h and E(S)−h, processes 516-522 are repeated and another random binary value ($r_2$) is generated and concatenated with the concatenated data string ($S''_N$) 325. For example, referring to FIG. 3A, the concatenated data string ($S''_N$) 325 now includes recent data string ($S'_N$) 312 and randomly generated binary values $r_1$ and $r_2$. As depicted, the second generated random binary value ($r_2$) is also set to an exemplary binary '1' value. If the determination at 522 continues to establishes that the calculated entropy value E"(S) of the concatenated data string ($S''_N$) 325 is outside the range, more random binary value (e.g., $r_1, r_2, r_3, r_4, \ldots, r_7$) are generated. The concatenated one or more random binary values (e.g., $r_1, r_2, r_3, r_4, \ldots, r_7$) form a dummy communication pattern that may be used to establish dummy communication sessions from communications device 102 (FIG. 1A) to computer server 106 (FIG. 1A) at time intervals (e.g., within each hourly interval) following the initiation of the obfuscation process.

As indicated at 521, in parallel with the establishing whether or not the calculated entropy value E"(S) of the concatenated data string (S"$_N$) 325 (FIG. 3A) is outside the range given by E(S)+h and E(S)−h (522), and generating the randomly generated binary values (e.g., $r_1, r_2, r_3, r_4, \ldots, r_7$), the process monitors whether the communication device 102 (FIG. 1A) is going to transmit actual information to server 106 (FIG. 1A). Referring to FIG. 5C, at 524, it is determined whether the generated binary value (e.g., $r_1$) associated with the dummy communication pattern (e.g., $r_1, r_2, r_3, r_4, \ldots, r_7$) complies (e.g., $r_1$=binary '1') with the communication device 102 desiring to transmit actual information to computer server 106 during the same time interval. If it is determined that the generated binary value (e.g., $r_1$) indicates the occurrence of a dummy communication session during the same time interval as communication device 102 desiring to transmit actual information to computer server 106, then at 526, actual data (e.g., video conference packets including multimedia data) is transmitted from communication device 102 to the computer server 106.

If at 524 it is determined that no desired communication session (i.e., $T_x$=None) is occurring from communication device 102 (FIG. 1A) to server 106 (FIG. 1A), then at 526, communication device 102 establishes a dummy communication session with server 106 according to the generated binary values (e.g., $r_1, r_2, r_3, r_4, \ldots, r_7$) representing the dummy traffic pattern. Provided $T_x$=None (524), at 526, during each corresponding time interval, communication device 102 establishes a dummy communication session with computer server 106. The dummy communication session may be an actual data communication session between the communications device 102 and server 106, whereby although an illusion of information/data exchange between the communications device 102 and server 106 is given, no information (e.g., video conference packets including multimedia data) is exchanged. For example, random or predetermined data of no informational value may be incorporated within the data packets. However, to an unauthorized entity monitoring the communications between device 102 and server 104, it will appear as a bonafide communications in which information is exchanged (e.g., audio, video, text, etc.)

Referring to FIG. 3A, for example, the dummy traffic pattern is given as $r_1$-$r_7$=1100101. Thus, during the first time interval where $r_1$=1, a dummy communication session is established between the communications device 102 (FIG. 1A) and the computer server 106 (FIG. 1A). During the second time interval where $r_2$=1, another dummy communication session is established between the communications device 102 and the computer server 106. During the third and the fourth time interval, where $r_3$=$r_4$=0, no dummy communication sessions are established between the communications device 102 and server 106. During the fifth time interval, where $r_5$=1, a dummy communication session is established between the communications device 102 and the computer server 106. During the sixth time interval, where $r_6$=0, no dummy communication session is established between the communications device 102 and the computer server 106. Finally, during the seventh time interval, where $r_7$=1, a dummy communication session is established between the communications device 102 and the computer server 106.

Referring back to FIG. 5B, in the above-given example (i.e., $r_1$-$r_7$=1100101), processes 516-522 stop producing binary values after generating $r_7$=1. This occurs, when at 522, a determination is made that the calculated entropy value E"(S) of the concatenated data string (S"N) 325 (FIG. 3A: S'$_N$+$r_1$-$r_7$) is within the range given by E(S)+h and E(S)−h. As indicated at 523, under this condition the process at 524 (FIG. 2C) continues to determine whether a desired communication session (i.e., if $T_x$=None) is occurring from communication device 102 (FIG. 1A) to server 106 (FIG. 1A), and whether this initiated communication session complies with (i.e., is the same as) the dummy communication scheduled to be transmitted in the same time interval or slot as the initiated communication session (i.e., a non-dummy communication session).

Referring to FIG. 5C, as indicated at 528, if the initiated communication session fails to comply with (i.e., not the same as) the dummy communication scheduled to be transmitted in the same time interval as the initiated communication session (i.e., a non-dummy communication session), the process of generating dummy transmissions for obfuscating traffic patterns resets by starting the process back at 510 (FIG. 5A). For example, when $r_6$=0, no dummy communication is required. However, if at the time interval associated with $r_6$, a desired communication session occurs from communication device 102 (FIG. 1A) to computer server 106 (FIG. 1A), the process resets back to 510 (FIG. 5A).

In the above-described exemplary embodiment, the determined entropy value for E(S) may be about 1.5-2.0, and the threshold range value (h) may be about 0.2-0.3. Thus, for E(S)=1.5 and h=0.2, the range of satisfactory communications not signalling a traffic pattern change include entropy values between 1.3 (i.e., E(S)−h and 1.7 (i.e., E(S)+h). The above-described exemplary embodiment utilizes two prior traffic patterns, a reference traffic pattern and a recent traffic pattern, to generate dummy communication sessions in order to maintain similar traffic activity between the a reference traffic pattern and a recent traffic pattern. The recent traffic pattern may include a different traffic pattern compared to the reference traffic pattern. The dummy communication sessions concatenated to the recent traffic pattern creates a more uniform traffic activity taken from the time the reference traffic pattern starts to the time the concatenated dummy communication sessions finish. In particular, the recent traffic pattern and the concatenated dummy communication sessions have an information content value (e.g., Entropy value) that is similar to that of the prior reference traffic pattern. Therefore, traffic activity changes associated with the recent traffic pattern are modified to be similar to that of the prior reference traffic pattern.

In some implementations the communication session patterns before obfuscation may be learned using machine learning or regression analysis programming. This enables a communications device such as device 102 (FIG. 1B) to predict when obfuscation may be necessary (i.e., switched on or off) in order to, among other things, preserve computational resources. Machine learning or regression analysis may also be employed to determine obfuscation behavior associated with generated obfuscated traffic. Thus, machine learning/regression analysis may be utilized to determine the cost of obfuscation by, for example, analyzing the overhead costs (e.g., computational resources, time, etc.) of entropy-based obfuscation (FIGS. 2A-2C) versus cloud-based server switching obfuscation (FIG. 4) or other techniques. Thus, a method of obfuscation may be selected based on this cost determination or latency between calls or performance of the communication and/or obfuscation system (i.e., any device (s) or system(s) running the obfuscation process(es)). Referring to FIG. 1B, according to one embodiment, the machine learning or regression analysis programming may form an additional part of the DTO program 124. According to another embodiment, the machine learning or regression analysis programming may reside within any one of the network interface 150, the network protocol component 128, or the telecommunication application program 126. According to yet another exemplary embodiment, a machine learning or regression component 123 may reside within a communications device such as device 102.

Thus, hybrid obfuscation may also be contemplated, whereby multiple obfuscation techniques (e.g., processes of FIGS. 2A-2C, FIG. 4, and FIGS. 5A-5C) can be used together. For example, based on latency between calls during the communication sessions, the performance of one or more of the communications devices, and/or the performance of one or more of the computer servers, pattern obfuscation using entropy (e.g., obfuscation processes of FIGS. 2A-2C or FIGS. 5A-5C) may be switched to obfuscation utilizing multiple servers (e.g., obfuscation process of FIG. 4) and vice versa.

It may be further appreciated that the obfuscation process can be utilized at one or more different nodes and/or on different devices used in a communication session. For example, referring back to FIG. 1A, the computer server 106 used to establish the communication session or provide the communications between devices 102 and 104 can apply learning and obfuscation based on at least one of the communications devices 102, 104 trusting the server 106.

Figure 6:
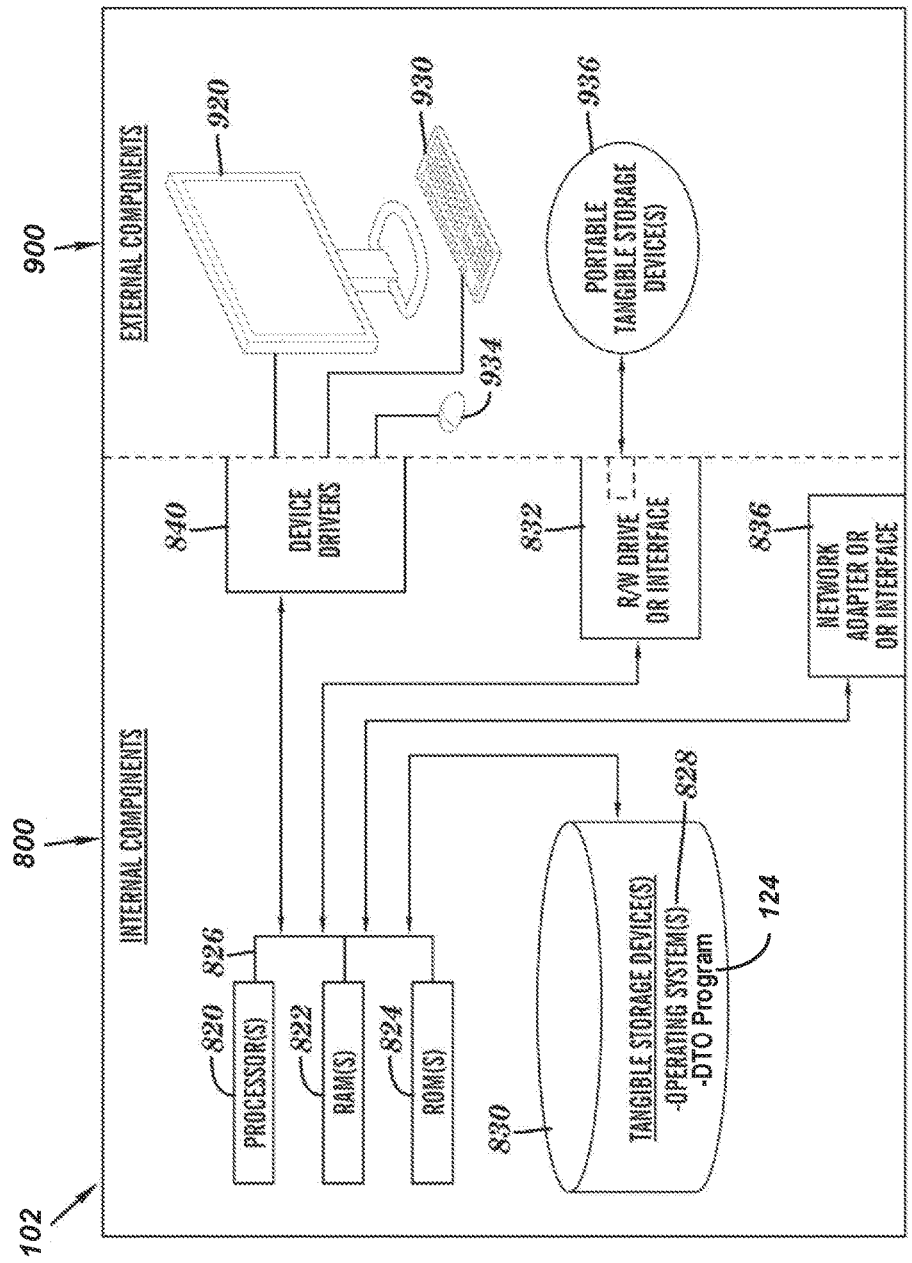
FIG. 6 is a block diagram of hardware and software for executing the process flows of FIGS. 2A-2C, FIG. 4, and FIGS. 5A-5C, according to one embodiment.

FIG. 6 shows a block diagram of the components of a data processing system 800, 900, that may be incorporated within communications devices 102 and 104 (FIG. 1A) in accordance with an illustrative embodiment of the present invention. It should be appreciated that FIG. 6 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

The data processing system 800, 900 may include may include a set of internal components 800 and a set of external components 900 illustrated in FIG. 6. The set of internal components 800 includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and programs such as Data Traffic Obfuscation Program (DTO) Program 124 is stored on one or more computer-readable tangible storage devices 830 for execution by one or more processors 820 via one or more RAMs 822 (which typically include cache memory). In the embodiment illustrated in FIG. 6, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

The set of internal components 800 also includes a R/W drive or interface 832 to read from and write to one or more portable computer-readable tangible storage devices 936 such as a CD-ROM, DVD, memory stick, magnetic tape, magnetic disk, optical disk or semiconductor storage device. The DTO program 124 can be stored on one or more of the respective portable computer-readable tangible storage devices 936, read via the respective R/W drive or interface 832 and loaded into the respective hard drive 830.

The set of internal components 800 may also include network adapters (or switch port cards) or interfaces 836 such as a TCP/IP adapter cards, wireless wi-fi interface cards, or 3G or 4G wireless interface cards or other wired or wireless communication links. DTO program 124 can be downloaded from an external computer (e.g., server) via a network (for example, the Internet, a local area network or other, wide area network) and respective network adapters or interfaces 836. From the network adapters (or switch port adaptors) or interfaces 836, the DTO program 124 is loaded into the respective hard drive 830. The network may comprise copper wires, optical fibers, wireless transmission, routers, firewalls, switches, gateway computers and/or edge servers.

The set of external components 900 can include a computer display monitor 920, a keyboard 930, and a computer mouse 934. External component 900 can also include touch screens, virtual keyboards, touch pads, pointing devices, and other human interface devices. The set of internal components 800 also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

As further depicted in FIG. 6, by executing the DTO program 124, traffic patterns between communicating entities such as communications devices 102 and 104 (FIG. 1A) are obfuscated. The DTO program 124 (also see FIG. 1B) may therefore execute any one of the processes corresponding to FIGS. 2A-2C, FIG. 4, or FIGS. 5A-5C based on, for example, the communicating parties (e.g., client-server-client, client-server, etc.) or the processing overhead at the client device (e.g., communications device A).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the one or more embodiment, the practical application or technical improvement over technologies found in the marketplace, or to enable others of ordinary skill in the art to understand the embodiments disclosed herein.

What is claimed is:

1. A computer-implemented method of obfuscating communication traffic patterns occurring over a cloud-based communication infrastructure including a plurality of computer servers, the computer-implemented method comprising:

accessing, at a first communications device, an information content threshold value associated with first data communication sessions between the first communications device and a second communications device;

accessing, at the first communications device, a first traffic pattern based on the first data communication sessions, the first traffic pattern determining communication occurrences between the first and the second communication devices over a first predefined time period;

generating, at the first communications device, based on a randomization process, a dummy data communication pattern for transmission to the second communications device;

generating a second traffic pattern for obfuscating a traffic pattern change between the first and the second traffic pattern, wherein the second traffic pattern is generated by appending the dummy data communication pattern to the first traffic pattern; and re-routing, using the network protocol, the first data communication sessions via the first computer server to a second data communication session having the second traffic pattern between the first communications device and the second communications device via a second computer server, wherein the second data communication session is established based on a detection of an information content value associated with the accessed first traffic pattern exceeding the information content threshold value.

2. The computer-implemented method of claim 1, wherein the accessing of the first traffic pattern at the first communication device comprises accessing the first traffic pattern from a telecommunication application executing on the first communication device.

3. The computer-implemented method of claim 1, wherein the first and the second computer servers used to establish the first communication sessions each comprises one of: a software as a service (SaaS) cloud service, a platform as a service (PaaS) cloud service, and an infrastructure as a service cloud service.

4. The computer-implemented method of claim 1, further comprising:

applying statistical analysis and learning to the first traffic pattern, wherein based on the statistical analysis, a determination corresponding to a second re-routing to the second computer server is made.

5. The computer-implemented method of claim 1, further comprising:

determining, at the first communications device, third data communication sessions with the second communications device via the second computer server using the network protocol; and accessing, at the first communications device, a second information content threshold value associated with the third data communication sessions between the first and the second communications devices.

6. The computer-implemented method of claim 5, further comprising:

accessing, at the first communications device, a third traffic pattern based on the third data communication sessions, the third traffic pattern determining communication occurrences between the first and the second communication devices over a second predefined time period; and determining, at the first communications device, a second information content value associated with the accessed third traffic pattern.

7. The computer-implemented method of claim 6, further comprising:

re-routing, using the network protocol, the third data communication sessions via the second computer server to a fourth data communication session between the first communications device and the second communications device via the first computer server, wherein the fourth data communication session is established based on a detection of the second information content value associated with the accessed third traffic pattern exceeding the second information content threshold value.

8. A computer program product for obfuscating communication traffic patterns occurring over a cloud-based communication infrastructure including a plurality of computer servers, the computer program product comprising:

one or more non-transitory computer-readable storage devices and program instructions stored on at least one of the one or more non-transitory storage devices, the program instructions executable by a processor, the program instructions comprising:

instructions to access, at a first communications device, an information content threshold value associated with first data communication sessions between the first communications device and a second communications device;

instructions to access, at the first communications device, a first traffic pattern based on the first data communication sessions, the first traffic pattern determining communication occurrences between the first and the second communication devices over a first predefined time period;

instructions to generate, at the first communications device, based on a randomization process, a dummy data communication pattern for transmission to the second communications device;

instructions to generate a second traffic pattern for obfuscating a traffic pattern change between the first and the second traffic pattern, wherein the second traffic pattern is generated by appending the dummy data communication pattern to the first traffic pattern; and instructions to re-route, using the network protocol, the first data communication sessions via the first computer server to a second data communication session having the second traffic pattern between the first communications device and the second communications device via a second computer server, wherein the second data communication session is established based on a detection of an information content value associated with the accessed first traffic pattern exceeding the information content threshold value.

9. The computer program product of claim 8, wherein the instructions to access the first traffic pattern at the first communication device comprises instructions to access the first traffic pattern from a telecommunication application executing on the first communication device.

10. The computer program product of claim 8, wherein the first computer server comprises one of: a software as a service (SaaS) cloud service, a platform as a service (PaaS) cloud service, and an infrastructure as a service cloud service.

11. The computer program product of claim 8, wherein the second computer server comprises one of: a software as a service (SaaS) cloud service, a platform as a service (PaaS) cloud service, and an infrastructure as a service cloud service.

12. The computer program product of claim 8, further comprising:
   instructions to detect, at the first communications device, third data communication sessions with the second communications device via the second computer server using the network protocol; and
   instructions to access, at the first communications device, a second information content threshold value associated with the third data communication sessions between the first and the second communications devices.

13. The computer program product of claim 12, further comprising:
   instructions to access, at the first communications device, a third traffic pattern based on the third data communication sessions, the third traffic pattern determining communication occurrences between the first and the second communication devices over a second predefined time period;
   instructions to determine, at the first communications device, a second information content value associated with the accessed third traffic pattern; and
   instruction to re-route, using the network protocol, the third data communication sessions via the second computer server to a fourth data communication session between the first communications device and the second communications device via the first computer server, wherein the fourth data communication session is established based on a detection of the second information content value associated with the accessed third traffic pattern exceeding the second information content threshold value.

14. A computer system for obfuscating communication traffic patterns occurring over a cloud-based communication infrastructure including a plurality of computer servers, the computer system comprising:
   one or more processors, one or more computer-readable memories, one or more non-transitory computer-readable storage devices, and program instructions stored on at least one of the one or more non-transitory storage devices for execution by at least one of the one or more processors via at least one of the one or more memories, wherein the computer system is capable of performing a method comprising:
      accessing, at a first communications device, an information content threshold value associated with first data communication sessions between the first communications device and a second communications device;
      accessing, at the first communications device, a first traffic pattern based on the first data communication sessions, the first traffic pattern determining communication occurrences between the first and the second communication devices over a first predefined time period;
      generating, at the first communications device, based on a randomization process, a dummy data communication pattern for transmission to the second communications device;
      generating a second traffic pattern for obfuscating a traffic pattern change between the first and the second traffic pattern, wherein the second traffic pattern is generated by appending the dummy data communication pattern to the first traffic pattern; and
      re-routing, using the network protocol, the first data communication sessions via the first computer server to a second data communication session having the second traffic pattern between the first communications device and the second communications device via a second computer server, wherein the second data communication session is established based on a detection of an information content value associated with the accessed first traffic pattern exceeding the information content threshold value.

15. The computer system of claim 14, wherein the accessing of the first traffic pattern at the first communication device comprises accessing the first traffic pattern from a telecommunication application executing on the first communication device.

16. The computer system of claim 14, wherein the first computer server used to establish the communication sessions comprises one of: a software as a service (SaaS) cloud service, a platform as a service (PaaS) cloud service, and an infrastructure as a service cloud service.

17. The computer system of claim 14, wherein the second computer server used to establish the communication sessions comprises one of: a software as a service (SaaS) cloud service, a platform as a service (PaaS) cloud service, and an infrastructure as a service cloud service.

18. The computer system of claim 14, further comprising:
   detecting, at the first communications device, third data communication sessions with the second communications device via the second computer server using the network protocol; and
   accessing, at the first communications device, a second information content threshold value associated with the third data communication sessions between the first and the second communications devices.

19. The computer system of claim 18, further comprising:
   accessing, at the first communications device, a third traffic pattern based on the third data communication sessions, the third traffic pattern determining communication occurrences between the first and the second communication devices over a second predefined time period; and
   determining, at the first communications device, a second information content value associated with the accessed third traffic pattern.

20. The computer system of claim 19, further comprising:
   re-routing, using the network protocol, the third data communication sessions via the second computer server to a fourth data communication session between the first communications device and the second communications device via the first computer server, wherein the fourth data communication session is established based on a detection of the second information content value associated with the accessed third traffic pattern exceeding the second information content threshold value.

* * * * *